United States Patent
Minase et al.

(10) Patent No.: US 11,884,262 B2
(45) Date of Patent: Jan. 30, 2024

(54) PARKING ASSIST APPARATUS

(71) Applicants: Toyota Jidosha Kabushiki Kaisha, Toyota (JP); Aisin Seiki Kabushiki Kaisha, Kariya (JP)

(72) Inventors: Yuki Minase, Toyota (JP); Kota Inoue, Toyota (JP); Takuya Nakagawa, Miyoshi (JP); Hiroyuki Tachibana, Kariya (JP); Norio Imai, Kariya (JP); Nozomu Maeda, Kariya (JP)

(73) Assignees: TOYOTA JIDOSHA KABUSHIKI KAISHA, Toyota (JP); AISIN SEIKI KABUSHIKI KAISHA, Kariya (JP)

( * ) Notice: Subject to any disclaimer, the term of this patent is extended or adjusted under 35 U.S.C. 154(b) by 307 days.

(21) Appl. No.: 16/794,920

(22) Filed: Feb. 19, 2020

(65) Prior Publication Data

US 2020/0282975 A1    Sep. 10, 2020

(30) Foreign Application Priority Data

Mar. 8, 2019    (JP) ................. 2019-042784

(51) Int. Cl.
*B60W 30/06*    (2006.01)
*B60W 10/04*    (2006.01)
(Continued)

(52) U.S. Cl.
CPC ............. *B60W 30/06* (2013.01); *B60L 15/30* (2013.01); *B60W 10/04* (2013.01); *B60W 10/18* (2013.01);
(Continued)

(58) Field of Classification Search
CPC ...... B60W 30/06; B60W 30/00; B60W 50/14; B60W 2554/00; B60W 10/20; B60W 10/18; B60W 2050/146; B60W 2520/10; B60W 10/184; B60W 2420/42; B60W 10/04; B60W 2710/18; B60W 30/09;
(Continued)

(56) References Cited

U.S. PATENT DOCUMENTS

2018/0043905 A1*  2/2018  Kim ................. B60W 50/10
2018/0208245 A1*  7/2018  Mizutani ........... B62D 15/0285
(Continued)

FOREIGN PATENT DOCUMENTS

JP    2004-284530 A    10/2004
JP    2012-217000 A    11/2012
(Continued)

*Primary Examiner* — Jelani A Smith
*Assistant Examiner* — Paul A Castro
(74) *Attorney, Agent, or Firm* — Dinsmore & Shohl LLP

(57) ABSTRACT

Provided is a parking assist apparatus for a vehicle, the parking assist apparatus including a first module configured to set, as a movement path, a path along which the vehicle is movable to a target position, and determine movement assist information for moving the vehicle along the movement path; and a second module configured to execute parking assist control such that the vehicle moves in accordance with the determined movement assist information, the second module being further configured to, when an occupant performs a first operation before the vehicle has reached the target position, stop the vehicle, and execute pause processing for maintaining the movement assist information.

9 Claims, 13 Drawing Sheets

(51) Int. Cl.
*B60W 10/18* (2012.01)
*B60W 50/14* (2020.01)
*B60W 10/20* (2006.01)
*B60L 15/30* (2006.01)

(52) U.S. Cl.
CPC ............ *B60W 10/20* (2013.01); *B60W 50/14* (2013.01); *B60W 2710/18* (2013.01); *B60W 2710/20* (2013.01); *B60W 2720/10* (2013.01)

(58) Field of Classification Search
CPC ......... B60W 2710/20; B60W 2540/18; B60W 10/06; B60W 2720/106; B60W 2540/10; B60W 2556/50; B60W 2050/143; B60W 2540/215; B60W 50/10; B60W 2720/10; B60W 30/18036; B60W 2540/12; B60W 40/105; B60W 50/08; B60W 2520/04; B62D 15/0285; B62D 15/028; B62D 15/027; B62D 15/0275; B62D 15/02; B62D 15/025; B62D 1/286; B62D 15/0265; B62D 1/00; B62D 15/021; B62D 5/046; B62D 1/02; B62D 5/0457; B62D 5/30; B60T 7/045; G08G 1/168; G08G 1/16; G08G 1/143; G08G 1/165; G08G 1/167; G08G 1/096844; G08G 1/04; G08G 1/096716; G08G 1/09675; G08G 1/096827; B60R 1/00; G05D 1/0061

See application file for complete search history.

(56) References Cited

U.S. PATENT DOCUMENTS

| | | | |
|---|---|---|---|
| 2018/0244312 A1* | 8/2018 | Kato | B62D 15/0285 |
| 2018/0257665 A1 | 9/2018 | Sannodo | |
| 2019/0278267 A1* | 9/2019 | Honda | B60W 40/09 |
| 2019/0351900 A1* | 11/2019 | Matsuda | G08G 1/096725 |

FOREIGN PATENT DOCUMENTS

| | | |
|---|---|---|
| JP | 2013-021468 A | 1/2013 |
| JP | 2015-003565 A | 1/2015 |
| JP | 2018-140757 A | 9/2018 |
| JP | 2018-144751 A | 9/2018 |

* cited by examiner

PARKING ASSIST APPARATUS

CROSS-REFERENCES TO RELATED APPLICATION

The present application claims priority to Japanese patent application No. JP 2019-042784 filed on Mar. 8, 2019, the content of which is hereby incorporated by reference in its entirety.

BACKGROUND

1. Technical Field

The present disclosure relates to a parking assist apparatus configured to execute parking assist control for parking a vehicle in a predetermined place or moving a parked vehicle from a parking space.

2. Description of the Related Art

Hitherto, there has been proposed a parking assist apparatus configured to detect a peripheral state of a vehicle by using vehicle peripheral sensors (including a camera and various sensors) installed in the vehicle, and execute parking assist control such that the vehicle moves/travels to a target position set based on the detected peripheral state (see Japanese Patent Application Laid-open No. 2018-140757).

An apparatus disclosed in the above-described patent document is hereinafter referred to as a "related-art apparatus". The related-art apparatus executes parking assist control when moving a vehicle from a parking space to a traveling road/lane.

The parking assist control includes steering angle control for controlling a steering angle of the vehicle, and vehicle speed control for controlling a traveling speed of the vehicle. The vehicle speed control includes driving force control for controlling a driving force of the vehicle, and braking force control for controlling a braking force of the vehicle.

When the vehicle is moved from the parking space to the traveling road through the parking assist control, a driver may operate an accelerator pedal and/or a steering wheel before the vehicle reaches a target position which is a position of the vehicle at a point in time at which the vehicle completes exiting from the parking space, In this case, the vehicle (own vehicle) suddenly enters the traveling road or suddenly changes a traveling direction. Therefore, there is a possibility that the own vehicle excessively approaches another vehicle which is traveling in the traveling road. In the related-art apparatus, no consideration is given to the above-mentioned problem that occurs when the driver performs "an operation other than a brake pedal operation" before the vehicle reaches the target position.

The present disclosure provides a parking assist apparatus capable of executing the parking assist control in a suitable manner even if the driver performs a predetermined operation during execution of the parking assist control and before the vehicle reaches the target position.

In one or more embodiments, a parking assist apparatus for a vehicle includes: an information acquisition device configured to acquire vehicle peripheral information including information on an object present in a peripheral region of the vehicle; a movement assist information determination module configured to, when an assist request is generated, set a target position which is a position of the vehicle at a point in time at which the vehicle completes parking in a parking space or exiting from the parking space based on the vehicle peripheral information, set, as a movement path, a path along which the vehicle is movable from a current position of the vehicle to the target position, and determine movement assist information including steering angle information representing changes in a steering angle of the vehicle when the vehicle moves along the movement path, and speed information representing changes in a speed of the vehicle when the vehicle moves along the movement path; and a parking assist module configured to execute parking assist control such that the vehicle moves in accordance with the determined movement assist information, the parking assist control including steering angle control for changing the steering angle of the vehicle, driving force control for controlling a driving force of the vehicle, and braking force control for controlling a braking force of the vehicle.

As described above, during execution of the parking assist control, the occupant may perform an operation (e.g., accelerator pedal operation) other than the brake pedal operation before the vehicle has reached the target position. In such a case, there is a possibility that the vehicle excessively approaches an object (e.g., another vehicle) present in the peripheral region of the vehicle.

In view of the above, the parking assist module is further configured to, when an occupant performs a predetermined first operation other than an operation with respect to a brake pedal in a first time period, apply the braking force to the vehicle to stop the vehicle, and execute pause processing for maintaining the movement assist information. The first time period is a period from a first, point in time at which the movement assist information is determined to a second point in time immediately before the vehicle has reached the target position.

According to the above configuration, the parking assist apparatus stops the vehicle when the occupant performs the predetermined first operation before the vehicle has reached the target position, Therefore, it is possible to prevent the vehicle from excessively approaching an object (three-dimensional object) present in the peripheral region of the vehicle.

In one or more embodiments, the parking assist module is configured to, when executing the pause processing, notify/inform the occupant of a predetermined resume operation to be performed by the occupant for resuming the parking assist control. In addition, the parking assist module is configured to, when the occupant performs the resume operation, resume the parking assist control in accordance with the movement assist information which has been maintained since the pause processing is started. Furthermore, the parking assist module is configured to, when the occupant does not perform the resume operation in a time period from the notification of the resume operation until a predetermined time threshold elapses, erase the movement assist information which has been maintained since the pause processing is started, and terminate the parking assist control.

According to the above configuration, even if the parking assist control is paused, the occupant performs the resume operation to thereby resume the parking assist control in accordance with the movement assist information which has been maintained/held since the pause processing is started. Meanwhile, at the point in time at which the pause processing for the parking assist control is started, the occupant may not wish to execute the parking assist control thereafter. According to the above configuration, as the occupant does not perform the resume operation, the parking assist control is terminated and therefore, the occupant can drive the vehicle by his/her operation.

In one or more embodiments, the parking assist module is configured to, when the occupant performs a predetermined second operation in a second time period from a point in time at which the vehicle has reached the target position until a predetermined time has elapsed, terminate the parking assist control at the point in time at which the occupant performs the second operation. Further, the parking assist module is configured to, when the occupant does not perform the second operation in the second time period, terminate the parking assist control at a point in time at which the second time period has elapsed.

According to the above configuration, in the second time period on and after the vehicle has reached the target position, the parking assist control is terminated at the point in time at which the occupant performs the second operation. Therefore, it is possible to hand over the driving operation of the vehicle to the occupant immediately at the point in time at which the occupant performs the second operation. Even if the occupant does not perform the second operation, it is possible to hand over the driving operation of the vehicle to the occupant at a point in time at which the second time period has elapsed.

In one or more embodiments, the parking assist module is configured to, when the occupant operates an accelerator pedal in the first time period, determine that the occupant performs the first operation, Further, the parking assist module is configured to, when the occupant operates the accelerator pedal or the brake pedal in the second time period, determine that the occupant performs the second operation.

When the occupant operates the accelerator pedal in the first time period until the vehicle has reached the target position, the vehicle of the vehicle is increased. Thus, there is a high possibility that the vehicle excessively approaches an object present in the peripheral region of the vehicle. According to the above configuration, the parking assist control is paused and the vehicle is stopped in the above-mentioned situation. Therefore, it is possible to prevent the vehicle from excessively approaching an object present in the peripheral region of the vehicle.

Meanwhile, when the occupant operates the accelerator pedal or the brake pedal on and after the vehicle has reached the target position, it is considered that the occupant can immediately drive the vehicle by his/her operation. According to the above configuration, the parking assist control is terminated in the above-mentioned situation to thereby immediately hand over the driving operation of the vehicle to the occupant.

According to one or more embodiments, one or more of the above-mentioned modules is implemented by a microprocessor programmed for performing one or more operations and/or functionality described herein. In addition, one or more of the modules may be implemented, in whole or in part, by specifically configured to hardware (e.g., by one or more application specific integrated circuits or ASIC(s)).

In the above description, in order to facilitate understanding of the present disclosure, a name and/or reference numeral used in one or more embodiments described later is enclosed in parentheses and assigned to each of the constituent features corresponding to the embodiments. However, each of the constituent features is not limited to the embodiments defined by the name and/or reference numeral. Further features relating to the above one or more aspects of the apparatus become apparent from the description herein and the accompanying drawings, Problems, configurations and effects other than those described above become apparent from the following description of the embodiments.

DESCRIPTION OF THE EMBODIMENTS

Now, referring to the accompanying drawings, a description is given of an embodiment of the present disclosure.

A parking assist apparatus according to one embodiment is applied to a vehicle. In the following, a vehicle equipped with the parking assist apparatus may be referred to as "own vehicle" in order to distinguish the vehicle from other vehicles.

Figure 1:
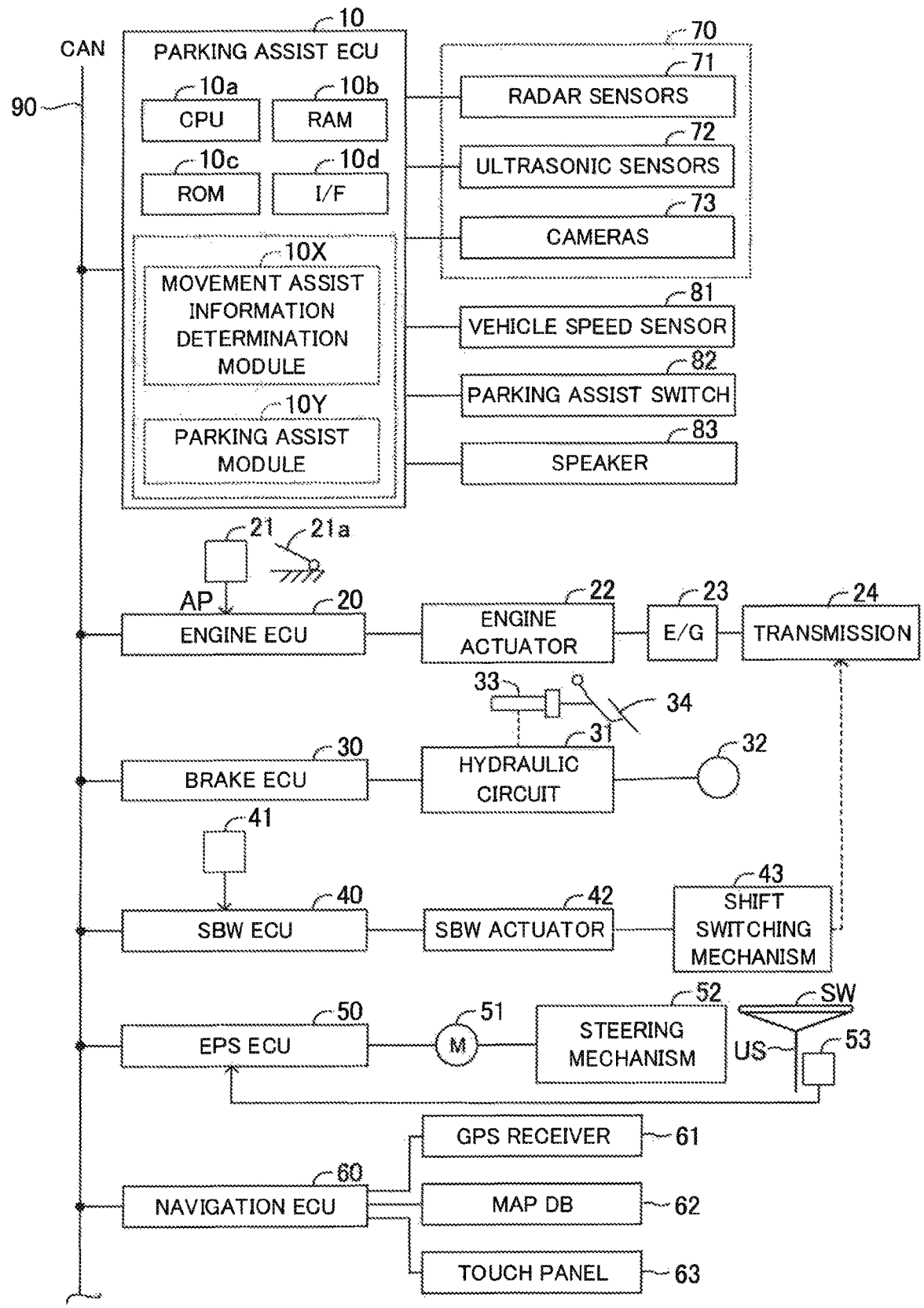
FIG. 1 is a schematic configuration diagram of a parking assist apparatus for a vehicle according to an embodiment.

As illustrated in FIG. 1, the parking assist apparatus includes a parking assist ECU 10. The parking assist ECU 10 includes a microcomputer including a central processing unit (CPU) 10a, a random-access memory (RAM) 10b, a read-only memory (ROM) 10c, an interface (I/F) 10d, and other components, The ECU herein stands for "electric control unit". The ECU includes a microcomputer including a CPU, a RAM, a ROM, an interface, and other components.

The CPU is configured to execute instructions stored in the ROM to implement various functions.

The parking assist ECU 10 is connected to an engine ECU 20, a brake ECU 30, a shift-by-wire (SBW) ECU 40, an electric power steering ECU (hereinafter referred to as "EPS ECU") 50, and a navigation ECU 60 via a controller area network (CAN) 90. These ECUs are connected to each other such that information can be transmitted and received to and from each other via the CAN 90, Therefore, a detection signal (detection value) of a sensor connected to a specific ECU is also transmitted to the other ECUs.

The engine ECU 20 is connected to engine state amount sensors and an engine actuator 22. The engine state amount sensors include an accelerator pedal operation amount sensor 21. The accelerator pedal operation amount sensor 21 is configured to detect an operation amount (also referred to an "accelerator opening") AP of an accelerator pedal 21a , and generate an output signal indicative of the operation amount AP.

The engine ECU 20 drives the engine actuator 22 based on the accelerator pedal operation amount AP and driving state amounts (including an engine speed) detected by the other engine state amount sensors. The engine ECU 20 is capable of changing a torque to be generated by an internal combustion engine 23 by driving the engine actuator 22. The torque generated by the internal combustion engine 23 is transmitted to drive wheels via a transmission 24. Thus, the engine ECU 20 is capable of controlling a driving force of the vehicle by controlling the engine actuator 22.

When the vehicle is a hybrid vehicle, the engine ECU 20 is capable of controlling a driving force of the vehicle to be generated by any one of or both of "an internal combustion engine and a motor" serving as vehicle driving sources. Further, when the vehicle is an electric vehicle, the engine ECU 20 is capable of controlling a driving force of the vehicle to be generated by a motor serving as a vehicle driving source.

The brake ECU 30 is connected to a hydraulic circuit 31. The hydraulic circuit 31 includes a reservoir (not shown), an oil pump (not shown), various valve devices (not shown) and the like, and functions as a brake actuator. The hydraulic circuit 31 is provided between a master cylinder 33 for pressurizing hydraulic oil by a depression force of a brake pedal 34 and a friction brake mechanism 32. The hydraulic circuit 31 adjusts a hydraulic pressure supplied to a wheel cylinder (not shown) in the friction brake mechanism 32 in accordance with a command sent from the brake ECU 30 to thereby control a braking pressure of the wheel cylinder. The wheel cylinder generates a friction braking force on each wheel by the braking pressure. Thus, the brake ECU 30 is capable of controlling a braking force of the vehicle by controlling the hydraulic circuit 31.

The SBW ECU 40 is connected to a shift lever sensor 41 and an SBW actuator 42. The shift lever sensor 41 is configured to detect a position of a shift lever. The SBW ECU 40 is configured to receive information on the position of the shift lever, and control the SBW actuator 42 based on the shift lever position. The SBW actuator 42 controls a shift switching mechanism 43 in accordance with a command sent from the SBW ECU 40 to switch a shift position of the transmission 24 to one position among a plurality of shift positions.

In the present example, the plurality of shift positions include at least a parking position, a neutral position, a forward drive position, and a reverse drive position. The parking position is a position in which the driving force is not transmitted to the drive wheels and the vehicle is, mechanically locked to a stop position, The neutral position is a position in which the driving force is not transmitted to the drive wheels and the vehicle is not mechanically locked to a stop position. The forward drive position is a position in which the driving force for moving the vehicle forward is transmitted to the drive wheels. The reverse drive position is a position in which the driving force for moving the vehicle backward is transmitted to the drive wheels.

More specifically, when the position of the shift lever is "P", the SBW ECU 40 drives the SBW actuator 42 to control the shift switching mechanism 43 such that the shift position of the transmission 24 is switched to the parking position, When the position of the shift lever is "N", the SBW ECU 40 drives the SBW actuator 42 to control the shift switching mechanism 43 such that the shift position of the transmission 24 is switched to the neutral position. When the position of the shift lever is "D", the SBW ECU 40 drives the SBW actuator 42 to control the shift switching mechanism 43 such that the shift position of the transmission 24 is switched to the forward drive position. When the position of the shift lever is "R", the SBW ECU 40 drives the SBW actuator 42 to control the shift switching mechanism 43 such that the shift position of the transmission 24 is switched to the reverse drive position.

The EPS ECU 50 is connected to an assist motor (M) 51. The assist motor 51 is integrated into a steering mechanism 52. The steering mechanism 52 is a mechanism for steering steered-wheels in response to a rotating operation of a steering wheel SW. The steering mechanism 52 includes the steering wheel SW, a steering shaft US coupled to the steering wheel SW, and a gear mechanism for steering (not shown). The EPS ECU 50 detects a steering torque input to the steering wheel SW by the driver through use of a steering torque sensor 53 provided in the steering shaft US, and drives the assist motor 51 based on the detected steering torque. The EPS ECU 50 applies a steering torque (steering assist torque) to the steering mechanism 52 through the drive of the assist motor 51 to thereby assist the steering operation of the driver.

In addition, when the EPS ECU 50 receives a steering command from the parking assist ECU 10 via the CAN 90 during execution of parking assist control described later, the EPS ECU 50 drives the assist motor 51 based on a steering torque identified by the steering command. This steering torque is different from the above-mentioned steering assist torque, and is a torque applied to the steering mechanism 52 in response to the steering command from the parking assist ECU 10 without requiring the steering operation of the driver. With this torque, an angle (namely, steered angle) of the steered-wheels of the vehicle is changed.

The navigation ECU 60 is connected to a GPS receiver 61 configured to receive a GPS signal for detecting the "latitude and longitude" of a place where the vehicle is positioned, a map database 62 having map information stored therein, and a touch panel 63. The touch panel 63 is a touch panel-type display and can display a map, an image, and the like. The navigation ECU 60 performs various arithmetic processing based on the latitude and longitude of the place where the vehicle is positioned, the map information, and the like, and displays on the touch panel 63 the position of the vehicle on the map. A display mode at the time when the "map and position of the vehicle on the map" are displayed on the touch panel 63 is hereinafter referred to as a "navigation mode".

The display mode of the touch panel 63 includes, in addition to the navigation mode, a parking assist mode. The parking assist mode is a display mode at the time when the vehicle is parked at a parking space or exited from the parking space, and is a display mode in which various images of a peripheral state of the vehicle are displayed as described later, When an assist request is generated as described later, the display mode is switched from the navigation mode to the parking assist mode.

The parking assist ECU 10 is connected to vehicle peripheral sensors 70. The vehicle peripheral sensors 70 are configured to acquire vehicle peripheral information, The vehicle peripheral information includes information on three-dimensional objects present in a peripheral region of the vehicle, and information on partition lines drawn on a road surface in the peripheral region of the vehicle. The three-dimensional objects include, for example, moving objects such as pedestrians, two-wheel vehicles, four-wheel vehicles and the like, and motionless objects such as guardrails, fences and the like. The three-dimensional object is hereinafter simply referred to as an "object". The vehicle peripheral sensors 70 include a plurality of radar sensors 71, a plurality of ultrasonic sensors 72, and a plurality of cameras 73.

The vehicle peripheral sensors 70 may be collectively referred to as an "information acquiring device configured to acquire the vehicle peripheral information", In addition, the vehicle does not necessarily include all of the radar sensors 71, the ultrasonic sensors 72 and the cameras 73 as the vehicle peripheral sensors, but may include at least one kind of the radar sensors 71, the ultrasonic sensors 72 and the cameras 73.

Each of the radar sensors 71 includes a radar transceiver (radar transmifting/receiving part) (not shown) and a signal processor (not shown). The radar transceiver radiates a radio wave in a millimeter waveband (hereinafter referred to as a "millimeter wave") to the peripheral region of the vehicle, and receives a millimeter wave (that is, reflected wave) reflected by an object (three-dimensional object) present within a radiation range. The signal processor acquires first object information based on, for example, a phase difference between the transmitted millimeter wave and the received reflected wave, an attenuation level of the reflected wave, and a time period required from the transmission of the millimeter wave to the reception of the reflected wave. The first object information includes, for example, a distance between the vehicle and the object, a relative speed between the vehicle and the object, and a relative position (direction) of the object with respect to the vehicle, The signal processor outputs the first object information to the parking assist ECU 10.

Each of the ultrasonic sensors 72 transmits an ultrasonic wave having a pulse form in a predetermined range in the peripheral region of the vehicle, and receives a reflected wave reflected by an object. The ultrasonic sensor 72 acquires second object information based on a period from the transmission of the ultrasonic wave to the reception of the ultrasonic wave. The second object information includes, for example, information on a reflection point which is a point on an object from which the transmitted ultrasonic wave has been reflected, and information on a distance between the ultrasonic sensor and the object. The ultrasonic sensor 72 outputs the second object information to the parking assist ECU 10.

Each of the plurality of cameras 73 is a digital camera incorporating an image pickup device such as a charge coupled device (CCD) and a CMOS image sensor (CIS). The camera 73 outputs image data of the peripheral region of the vehicle at a predetermined frame rate. The camera 73 captures a peripheral state (including the position and shape of an object and the position and shape of a partition line) of the vehicle to be checked when the vehicle is parked at a parking space or exited from the parking space to thereby acquire image data. The camera 73 outputs the image data to the parking assist ECU 10. Specifically, the plurality of cameras 73 output to the parking assist ECU 10 front image data, rear image data, right side image data, and left side image data, respectively. The front image data is image data acquired by capturing a front region of the vehicle. The rear image data is image data acquired by capturing a rear region of the vehicle. The right side image data is image data acquired by capturing a right side region of the vehicle. The left side image data is image data acquired by capturing a left side region of the vehicle.

The parking assist ECU 10 receives the above-mentioned pieces of information from each of the radar sensors 71 and the ultrasonic sensors 72 each time a predetermined time (hereinafter also referred to as "first time" for the sake of convenience) elapses. The parking assist ECU 10 plots the pieces of information (including a position of a reflection point which is a point on an object from which the millimeter wave has been reflected, and a position of a reflection point which is a point on an object from which the ultrasonic wave has been reflected) on a two-dimensional map. This two-dimensional map is a plan view in which the position of the vehicle is set as an origin, a travel direction of the vehicle is set as an X axis, and a left direction of the vehicle is set as a Y axis. The "position of the vehicle" is a predetermined geometric center position of the vehicle in plan view. The parking assist ECU 10 detects an object present in the peripheral region of the vehicle based on the shape formed by a group of reflection points on the two-dimensional map, and identifies the position (distance and azimuth orientation) of the object with respect to the vehicle and the shape of the object.

The position of the vehicle may also be another specific position on the vehicle (e.g., a center position of a left front wheel and a right front wheel in plan view, or a center position of a left rear wheel and a right rear wheel in plan view).

The parking assist ECU 10 acquires the image data from each of the cameras 73 each time the first time elapses. The parking assist ECU 10 detects an object present in the peripheral region of the vehicle by analyzing the image data from each camera 73. and identifies the position (distance and azimuth orientation) of the object with respect to the vehicle and the shape of the object. The parking assist ECU 10 draws on the above-mentioned two-dimensional map the object which has been detected based on the image data, Therefore, the parking assist ECU 10 can detect objects present in the peripheral region of the vehicle (within a predetermined distance range from the position of the vehicle) based on the information drawn on the two-dimensional map.

Further, the parking assist ECU 10 detects a "region in which an object is not present" in the peripheral region of the vehicle based on the information drawn on the two-dimensional map. When the region in which an object is not present is a region having a size and a shape that allow the vehicle to park (or exit from a parking space) with room to spare, the parking assist ECU 10 determines that region to be a "parking-possible region (exit-possible region)". When partition lines defining a parking space have been detected in the peripheral region of the vehicle, the parking-possible area is, for example, a rectangular area between the detected separation lines, with a long side that is larger than the length in the longitudinal direction of the vehicle by a first margin and a short side that is longer than the length in the lateral direction of the vehicle by a second margin.

The parking assist ECU 10 is further connected to a vehicle speed sensor 81, a parking assist switch 82, and a speaker 83.

The vehicle speed sensor 81 detects a traveling speed of the vehicle (vehicle speed), and outputs a signal indicative of the vehicle speed.

The parking assist switch 82 is a switch to be operated (pressed/depressed) when the driver instructs the parking assist ECU 10 to start the parking assist control (that is, when the driver generates an assist request described later).

The speaker 83 generates a sound when a command to utter a sound is received from the parking assist ECU 10.

(Screen Display)

Figure 2:
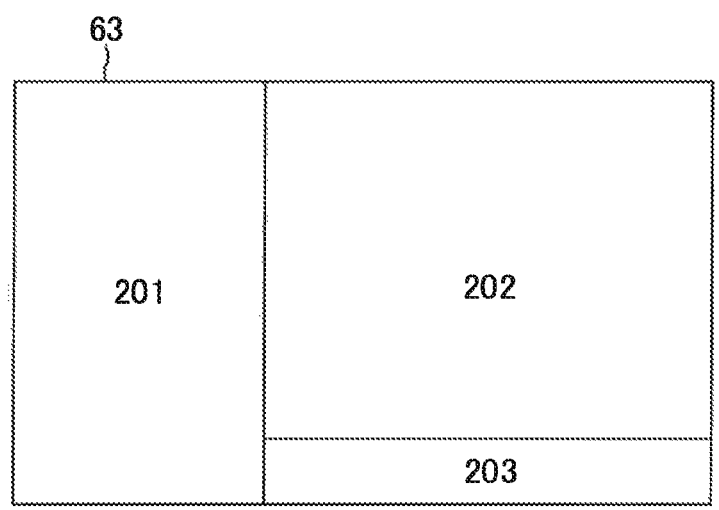
FIG. 2 is a diagram for illustrating a screen (assist mode screen) of a touch panel illustrated in FIG. 1 when a display mode of the touch panel is a parking assist mode.

Next, a screen on the touch panel 63 (hereinafter simply referred to as "assist mode screen") at the time when the display mode is the parking assist mode will be described, As illustrated in FIG. 2, the assist mode screen has a first display region 201, a second display region 202, and a third display region 203. The first display region 201 is a region on the left side obtained when the screen is divided into two regions of left and right regions, The second display region 202 is a part of the region on the right side obtained when the screen is divided into the left and right regions as described above, and is a region on the upper side obtained when the region on the right side is divided into two regions of upper and lower regions. The third display region 203 is a region on the lower side obtained when the above-mentioned region on the right side is divided into the upper and lower regions.

(Image Generation)

When the display mode is the parking assist mode, the parking assist ECU 10 displays a viewpoint image and a travel direction image, which are described below, on the assist mode screen, In the following, a method of generating each of the viewpoint image and the travel direction image will be briefly described.

The parking assist ECU 10 generates an image (referred to as "viewpoint image") of the vehicle and the peripheral region of the vehicle as viewed from a set virtual viewpoint position, based on the front image data, the rear image data, the right side image data and the left side image data which have been acquired by the cameras 7 3. A method of generating such a viewpoint image is well known (see, for example, Japanese Patent Application Laid-open No. 2012-217000 and Japanese Patent Application Laid-open No. 2013-021468), Therefore, an example of the method of generating the viewpoint image is briefly described below.

The parking assist ECU 10 generates three-dimensional data on the peripheral region of the vehicle based on the above-mentioned pieces of the image data. The parking assist ECU 10 sets a virtual viewpoint in the three-dimensional data, The virtual viewpoint is defined by a viewpoint position and a viewing direction. The parking assist ECU 10 extracts an image based on the set virtual viewpoint from the three-dimensional data to thereby obtain a viewpoint image which is an image of the vehicle and the peripheral region of the vehicle. For example, the viewpoint position of the virtual viewpoint is a position separated from the center position in plan view of a vehicle body of the vehicle by a predetermined distance in a directly upward direction. The viewing direction of the virtual viewpoint is a directly downward direction from the viewpoint position toward the vehicle. Therefore, the viewpoint image is an image looking down on the vehicle from a position directly above the vehicle, Such a viewpoint image is also referred to as "overhead view image".

The parking assist ECU 10 generates an image (referred to as "travel direction image") showing the region of the travel direction of the vehicle based on the front image data and the rear image data. When the vehicle is moving forward or in a stopped state, the parking assist ECU 10 generates a travel direction image for showing the region in front of the vehicle based on the front image data. Meanwhile, when the vehicle is moving in reverse, the parking assist ECU 10 generates a travel direction image for showing the region behind the vehicle based on the rear image data.

Figure 3:
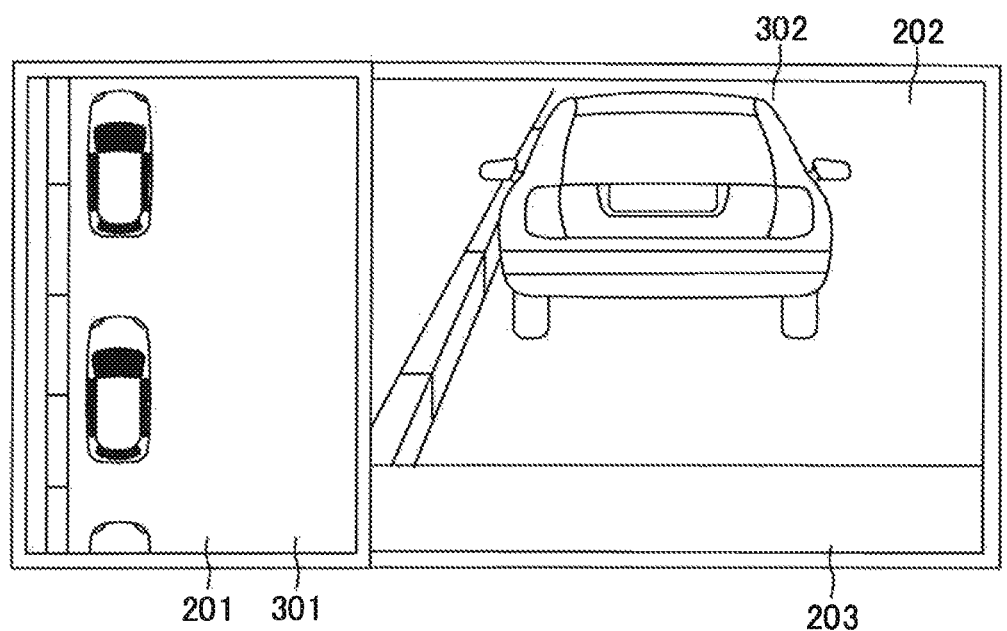
FIG. 3 is a diagram for illustrating a state in which an overhead view image and a travel direction image are displayed on the assist mode screen illustrated in FIG. 2.

When the display mode is the parking assist mode, as illustrated in FIG. 3, the parking assist ECU 10 displays an overhead view image 301 in the first display region 201, and displays a travel direction image 302 in the second display region 202.

(Parking Assist Control)

The parking assist ECU 10 monitors the operation with respect to the parking assist switch 82, the position of the shift lever and the like, and selects any one assist mode of an exit-from-parking-space mode, a perpendicular-parking mode, and a parallel-parking mode.

For example, when the position of the shift lever is "P", as the driver depresses the parking assist switch 82 one time, the exit-from-parking-space mode is selected as the assist mode. When the position of the shift lever is "D", as the driver depresses the parking assist switch 82 one time, the perpendicular-parking mode is selected as the assist mode. When the position of the shift lever is "D", as the driver depresses the parking assist switch 82 twice, the parallel-parking mode is selected as the assist mode.

The exit-from-parking-space mode is a mode for assisting exit of a parked vehicle from a parking space. Specifically, the exit-from-parking-space mode is a mode for assisting movement of the vehicle parked by "parallel-parking" which will be described later, to a traveling road.

The perpendicular-parking mode is a mode for assisting parking of the vehicle by perpendicular-parking. "Perpendicular-parking" is to park the own vehicle in a direction perpendicular to a travel direction of a road being traveled along. The perpendicular-parking is synonymous with moving the own vehicle to park the own vehicle in parallel to other parked vehicles. More specifically, the perpendicular-parking refers to parking the own vehicle such that one side of the own vehicle is opposed to one side of another vehicle (first another vehicle) and the other side of the own vehicle is opposed to one side of another vehicle (second another vehicle), and a longitudinal direction axis passing through the center of the own vehicle in the vehicle width direction and a longitudinal direction axis passing through the center of each of the first and second another vehicles in the vehicle width direction are parallel to each other. The perpendicular-parking includes parking the own vehicle such that the own vehicle faces in a right-angle direction to the travel direction of the road being traveled along and at least one of the left and right sides of the own vehicle is parallel to "a white line, a wall, a fence, a guardrail, or the like".

The parallel-parking mode is a mode for assisting parking of the vehicle by parallel-parking, "Parallel-parking" is to park the own vehicle in a direction parallel to the travel direction of the road being traveled along. The parallel-parking is synonymous with parking the own vehicle to come into line with other vehicles parked along the travel direction of the road. More specifically, the parallel-parking refers to parking the own vehicle such that the front end portion of the own vehicle is opposed to the rear end portion (or front end portion) of the first another vehicle and the rear end portion of the own vehicle is opposed to the front end portion (or rear end portion) of the second another vehicle, and the longitudinal direction axis passing through the center of the own vehicle in the vehicle width direction and the longitudinal direction axis passing through the center of each of the first and second another vehicles in the vehicle width direction are positioned on substantially the same line.

When the exit-from-parking-space mode is selected, the parking assist ECU 10 sets a target region in the exit-possible region. The target region is a region in which the vehicle body of the vehicle is to occupy when the vehicle completes exiting from a parking space. The parking assist ECU 10 sets, as a target position, the position of the vehicle at the point in time at which the vehicle completes moving to the target region. The target position is a position where the geometric center position of the vehicle in plan view should reach. In the description, "moving the center position of the vehicle to the target position or a predetermined position" will he simply expressed as "moving the vehicle to the target position or the predetermined position".

The parking assist ECU 10 calculates a movement path along which the vehicle is movable from the current position to the target position on the two-dimensional map. The movement path is a path along which the center position of the vehicle can be moved from the current position to the target position while maintaining a gap between the vehicle body and an object (e.g., another vehicle, a curb stone, and a guardrail) at a predetermined distance or longer, The movement path may also be calculated by one of various known calculation methods (e.g., a method proposed in Japanese Patent Application Laid-open No. 2015-3565).

When the vehicle cannot move to the target position merely by moving the vehicle in forward only once, the parking assist ECU 10 calculates the movement path as follows. For example, the parking assist ECU 10 calculates a first path for moving the vehicle in reverse to a travel-direction switching position (i.e., position at which the vehicle is to temporarily stop in order to switch the position of the shift lever from the reverse-drive position (R) to the forward-drive position (D)) from the current position, and a second path for moving the vehicle forward from the travel-direction switching position to the target position.

As the parking assist ECU 10 determines the movement path, the parking assist ECU 10 determines/sets "a movement direction of the vehicle (specifically, the shift position of the transmission 24), a steering angle pattern and a speed pattern" for moving the vehicle along the movement path. Hereinafter, information on the movement direction of the vehicle, the steering angle pattern and the speed pattern will be collectively referred to as "movement assist information".

The parking assist ECU 10 transmits a shift control command to the SBW ECU 40 via the CAN 90 in accordance with the determined shift position. When the shift control command has been received from the parking assist ECU 10, the SBW ECU 40 drives the SBW actuator 42 to change the shift position of the transmission 24 to the position specified by the shift control command (i.e., executes shift control).

The steering angle pattern (steering angle information) is data in which the center position of the vehicle on the movement path and the steering angle are associated with each other, and represents changes in the steering angle (i.e., target value of the steering angle) when the center position of the vehicle moves along the movement path. The parking assist ECU 10 transmits a steering command (including the target value of the steering angle) to the EPS ECU 50 via the CAN 90 in accordance with the determined steering angle pattern. When the steering command has been received from the parking assist ECU 10, the EPS ECU 50 drives the assist motor 51 based on the steering torque specified by the steering command to cause the actual steering angle to match the target value of the steering angle (i.e., executes steering angle control).

The speed pattern (speed information) is data in which the center position of the vehicle on the movement path and the vehicle speed (traveling speed) are associated with each other, and represents changes in the vehicle speed when the center position of the vehicle moves along the movement path. The speed pattern is set such that the vehicle speed becomes equal to a final target vehicle speed at a point in time at which the center position of the vehicle has, reached the target position. The final target vehicle speed may be zero. The parking assist ECU 10 transmits a driving force control command to the engine ECU 20 via the CAN 90 in accordance with the determined speed pattern. When the driving force control command has been received from the parking assist ECU 10, the engine ECU 20 controls the engine actuator 22 in accordance with the driving force control command (i.e., executes driving force control for controlling the driving force of the vehicle). The parking assist ECU 10 also transmits a braking force control command to the brake ECU 30 via the CAN 90 in accordance with the determined speed pattern. When the braking force control command has been received from the parking assist ECU 10, the brake ECU 30 controls the hydraulic circuit 31 in accordance with the braking force control command (i.e., executes braking force control for controlling the braking force of the vehicle).

When the perpendicular-parking mode or the parallel-parking mode is selected, the parking assist ECU 10 executes the parking assist control in the same manner. That is, the parking assist ECU 10 sets the target region in the parking-possible region. In this situation, the target region is a region in which the vehicle body of the vehicle is to occupy when the vehicle completes parking. The parking assist ECU 10 sets, as the target position, the center position of the vehicle at the completion of the parking in the target region. The parking assist ECU 10 calculates the movement path for moving the vehicle from the current position to the target position. The parking assist ECU 10 determines/sets the movement assist information for moving the vehicle along the movement path. Then, the parking assist ECU 10 executes the shift control, the steering ang e control, the driving force control, and the braking force control in accordance with the movement assist information.

(Assist Request)

The parking assist ECU 10 monitors the operation with respect to the parking assist switch 82, the shift position and the peripheral state of the vehicle as described below, and determines whether or not an assist request is issued/generated, The assist request includes an exit-from-parking-space assist request, a perpendicular-parking assist request, and a parallel-parking assist request.

1. Exit-From-Parking-Space Assist Request

The parking assist ECU 10 determines that the exit-from-parking-space assist request has been issued when all the conditions described below are satisfied.

(Condition A1) The assist request has not been issued.

(Condition A2) The exit-from-parking-space mode has been selected. That is, the parking assist switch 82 is depressed once in a situation in which the shift position is the parking position (P).

(Condition A3) The vehicle speed at the time when the condition A2 is satisfied is equal to a predetermined stop determination vehicle speed (for example, 0 [km/h]).

(Condition A4) An exit-possible region has been detected. This exit-possible region is a region in a traveling road adjacent to a space in which the vehicle is parked, and has a size and shape allowing the vehicle to move thereto through the exit-from-parking-space mode, 2. Perpendicular-Parking Assist Request The parking assist ECU 10 determines that the perpendicular-parking assist request has been issued when all the conditions described below are satisfied, (Condition B1) The assist, request has not been issued.

(Condition B2) The perpendicular-parking mode has been selected. That is, the parking assist switch 82 is depressed once in a situation in which the shift position is the forward-drive position (D).

(Condition B3) The vehicle speed at the time when the condition B2 is satisfied is equal to or lower than a predetermined low speed determination vehicle speed (for example, 30 [km/h]).

(Condition B4) A perpendicular-parking-possible region has been detected, This perpendicular-parking-possible region is a region adjacent to a traveling road, and has a size and shape allowing the vehicle to be parked through the perpendicular-parking mode.

3. Parallel-Parking Assist Request

The parking assist ECU 10 determines that the parallel-parking assist request has been issued when all the conditions described below are satisfied.

(Condition C1) The assist request has not been issued.

(Condition C2) The parallel-parking mode has been selected. That is, the parking assist switch 82 is depressed twice consecutively within a predetermined time in a situation in which the shift position is the forward-drive position (D).

(Condition C3) The vehicle speed at the time when the condition C2 is satisfied is equal to or lower than the predetermined low speed determination vehicle speed (for example, 30 [km/h]).

(Condition C4) A parallel-parking-possible region has been detected. This parallel-parking-possible region is a region adjacent to a traveling road, and has a size and shape allowing the vehicle to be parked through the parallel-parking mode.

When the exit-from-parking-space assist request has been issued. the parking assist ECU 10 executes the parking assist control in the exit-from-parking-space mode.

When the perpendicular-parking assist request has been issued, the parking assist ECU 10 executes the parking assist control in the perpendicular-parking mode.

When the parallel-parking assist request has been issued, the parking assist ECU 10 executes the parking assist control in the parallel-parking mode.

As described above, the parking assist ECU 10 has functions as a "movement assist information determination module 10X programmed to determine the movement assist information" and as a "parking assist module WY programmed to execute the parking assist control including the shift control, the steering angle control, the driving force control, and the braking force control in accordance with the movement assist information", which are implemented by the CPU 10*a*.

(Outline of Operation)

As described above, when the vehicle is moved from a parking space to a traveling road through the parking assist control, the driver may operate the accelerator pedal 21*a* before the center position of the vehicle reaches the target position. In this case, since the vehicle (own vehicle) suddenly enters the traveling road, there is a possibility that the own vehicle excessively approaches another vehicle which is traveling in the traveling road.

In view of the above problem, according to the present embodiment, when the driver performs a predetermined operation (for example, the driver operates the accelerator pedal 21*a* ) before the center position of the vehicle has reached the target position, the parking assist apparatus pauses (temporarily stops) the parking assist control and stops the vehicle. The parking assist apparatus maintains (holds) the movement assist information while the parking assist control is paused. Since the own vehicle is stopped in this manner, it is possible to prevent the own vehicle from excessively approaching another vehicle which is traveling in the traveling road.

Further, when the parking assist control is paused, the parking assist apparatus notifies(informs) the driver of a predetermined resume operation to be performed by the driver for resuming the parking assist control. When the driver performs the resume operation, the parking assist apparatus resumes the parking assist control in accordance with the movement assist information which has been maintained/held since the, point in time at which the pause of the parking assist control is started. In this manner, even if the parking assist control is paused, the driver can resume/restart the parking assist control merely by performing the resume operation.

(Operation for Exit-From-Parking-Space Assist)

Next, operations to be performed when the parking assist control is executed in the exit-from-parking-space mode are described. Hereinafter, the parking assist control in the exit-from-parking-space mode will be simply referred to as an "exit assist", The CPU 10*a* of the parking assist ECU 10 (hereinafter simply referred to as "CPU") is configured to execute each of the routines illustrated in FIG. 4 to FIG. 7 each time a "predetermined second time equal to or longer than the first time" elapses.

The CPU further acquires the vehicle peripheral information from the vehicle peripheral sensors 70 by executing a routine (not shown) each time the first time elapses. The CPU also updates the two-dimensional map based on the vehicle peripheral information by executing a routine (not shown) each time the first time elapses.

In addition, when an ignition key switch (start switch) (not shown) of the vehicle is changed from an off position to an on position, the CPU executes an initialization routine (not shown) to set values of various flags, which are described later, to "0" (i.e., reset the values of various flags).

Figure 4:
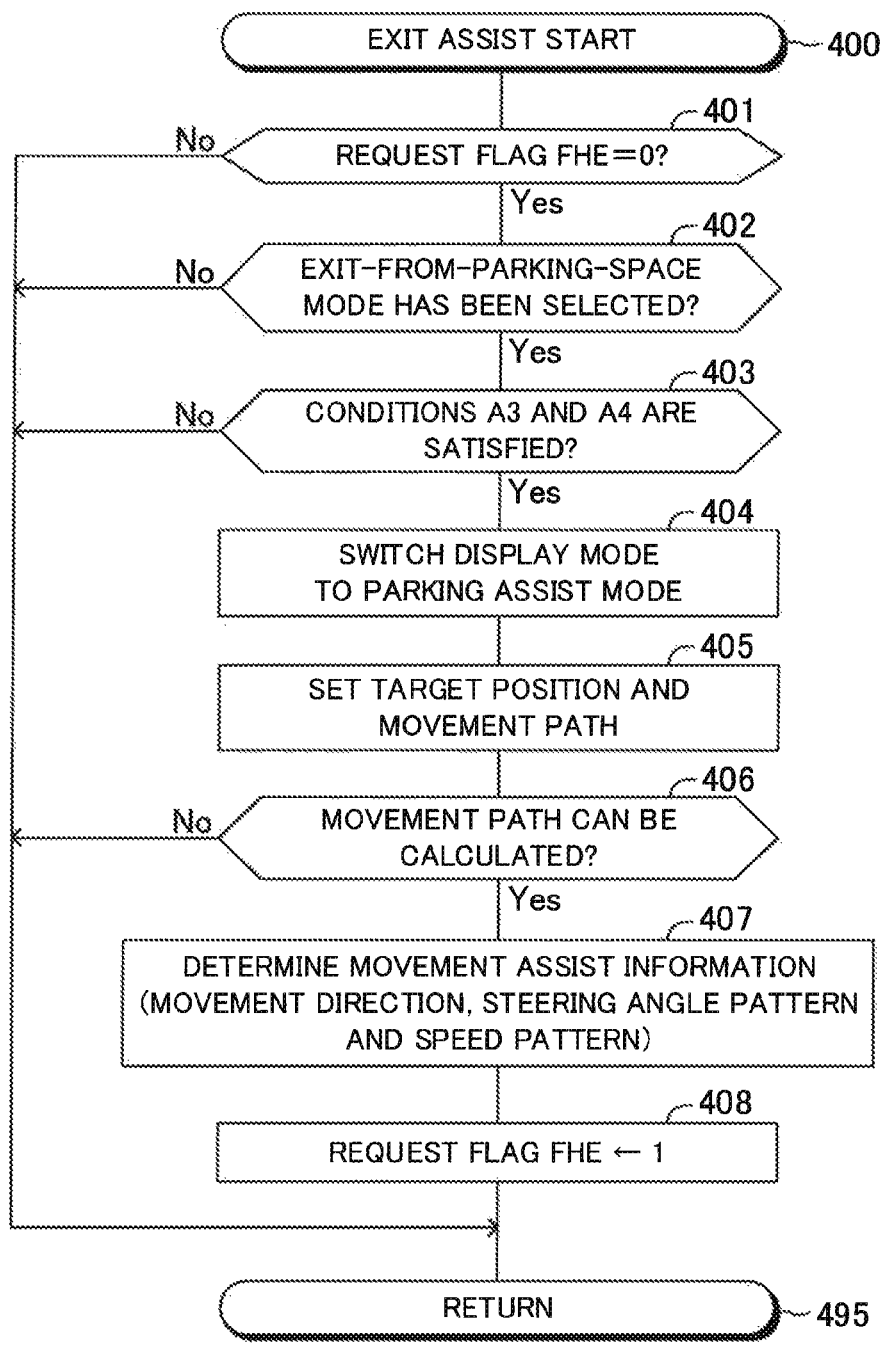
FIG. 4 is a flowchart for illustrating an "exist-assist start routine" to be executed by an CPU of a parking assist ECU in the embodiment.

When a predetermined timing is reached, the CPU starts the processing from Step 400 of FIG. 4, and proceeds to Step 401. In Step 401, the CPU determines whether or not a value of an assist request flag (hereinafter simply referred to as "request flag") FHE is "0". When the value of the request flag FHE is "0", this means that the assist request (any one of the exit-from-parking-space assist request, the perpendicular-parking assist request, and the parallel-parking assist request) has not been issued. When the value of the request flag FHS is "1", this means that the assist request has been issued. In other words, in Step 401, the CPU determines whether or not the condition A1 is satisfied. When the value of the request flag FHE is not "0", the CPU makes a "No"

determination in Step 401, proceeds directly to Step 495, and tentatively terminates the present routine.

Assuming that the value of the request flag FHE is "0", the CPU makes a "Yes" determination in Step 401, and proceeds to Step 402. In Step 402, the CPU determines whether or not the exit-from-parking-space mode has been selected (whether or not the condition A2 is satisfied). When it is determined that the exit-from-parking-space mode has not been selected, the CPU makes a "No" determination in Step 402, proceeds directly to Step 495, and tentatively terminates the present routine.

Figure 8:
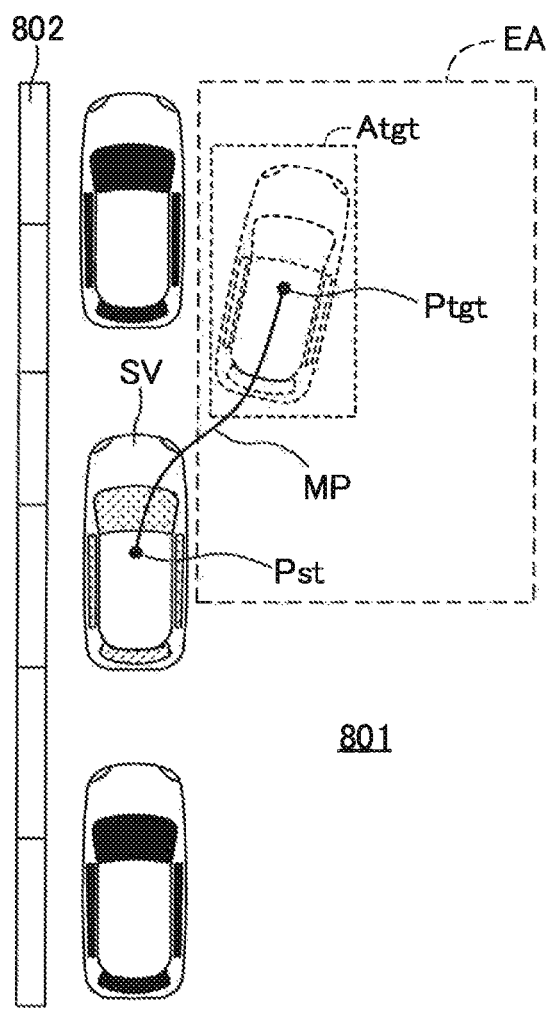
FIG. 8 is a diagram for illustrating a situation in which the vehicle is exited to a traveling road through the parking assist control from a state in which the vehicle is parked in the traveling road by parallel-parking.

It is assumed that the current situation is a situation illustrated in FIG. 8. The vehicle SV is parked adjacent to a curb stone 802 in a traveling road 801 (that is, the vehicle SV is parked by the parallel-parking). The shift position of the vehicle SV is the parking position (P). In this situation, the driver depresses the parking assist switch 82 once to select the exit-from-parking-space mode.

Thus, the CPU makes a "Yes" determination in step 402, and proceeds to Step 403 to determine whether or not both of the conditions A3 and A4 are satisfied. The conditions A3 and A4 will be collectively referred to as an "execution condition for the exit assist". When the execution condition for the exit assist is not satisfied, the CPU makes a "No" determination in Step 403, proceeds directly to Step 495, and tentatively terminates the present routine.

In the situation in FIG. 8, the vehicle SV is in a stopped state (that is, the speed of the vehicle SV is 0 [km/h]). Further, the CPU has detected an exit-possible region EA in the traveling road 801. Since the execution condition for the exit assist is satisfied, the CPU makes a "Yes" determination in Step 403. The CPU executes the processing of Steps 404 and 405 (described below) in sequence, and then, proceeds to Step 406.

Step 404: The CPU switches the display mode of the screen displayed on the touch panel 63 from the navigation mode to the parking assist mode, Thus, the assist mode screen is displayed on the touch panel 63.

Step 405: The CPU sets a target region Atgt in the detected exit-possible region EA. Further, the CPU sets, as a target position Ptgt, the center position of the vehicle SV at the point in time at which the vehicle SV completes moving to the target region Atgt.

Further, in Step 405, the CPU calculates a movement path MP for moving the center position of the vehicle SV from the current position (start position) Pst to the target position Ptgt. The movement path MP is a path along which the vehicle body of the vehicle SV can be moved from the start position Pst to the target position Ptgt while maintaining a gap between the vehicle body and an object (e.g., another vehicle, a curb stone, and a guardrail) at the predetermined distance or longer, If two or more movement paths can be calculated, the CPU sets/determines a movement path having the shortest distance among those paths as the final movement path MR.

Next, in Step 406, the CPU determines whether or not the movement path MP can be calculated, Depending on the situation, there may be a case where no movement path can be calculated, In that case, the CPU makes a "No" determination in Step 406, proceeds directly to Step 495, and tentatively terminates the present routine. in addition, the CPU may display in the third display region 203 of the assist mode screen a message notifying the driver that the exit assist cannot be executed, and cause the speaker 83 to utter the message.

Since the CPU can calculate the movement path MP in the situation in FIG. 8, the CPU makes a "Yes" determination in Step 406. Next, the CPU executes the processing of Steps 407 and 408 (described below) in sequence. Thereafter, the CPU proceeds to Step 495, and tentatively terminates the present routine.

Step 407: The CPU determines the movement assist information for moving the vehicle SV along the movement path MP. The movement assist information includes the movement direction of the vehicle (specifically, the shift position), the steering angle pattern, and the speed pattern.

Step 408: The CPU sets the value of the request flag FHE to "1".

Figure 5:
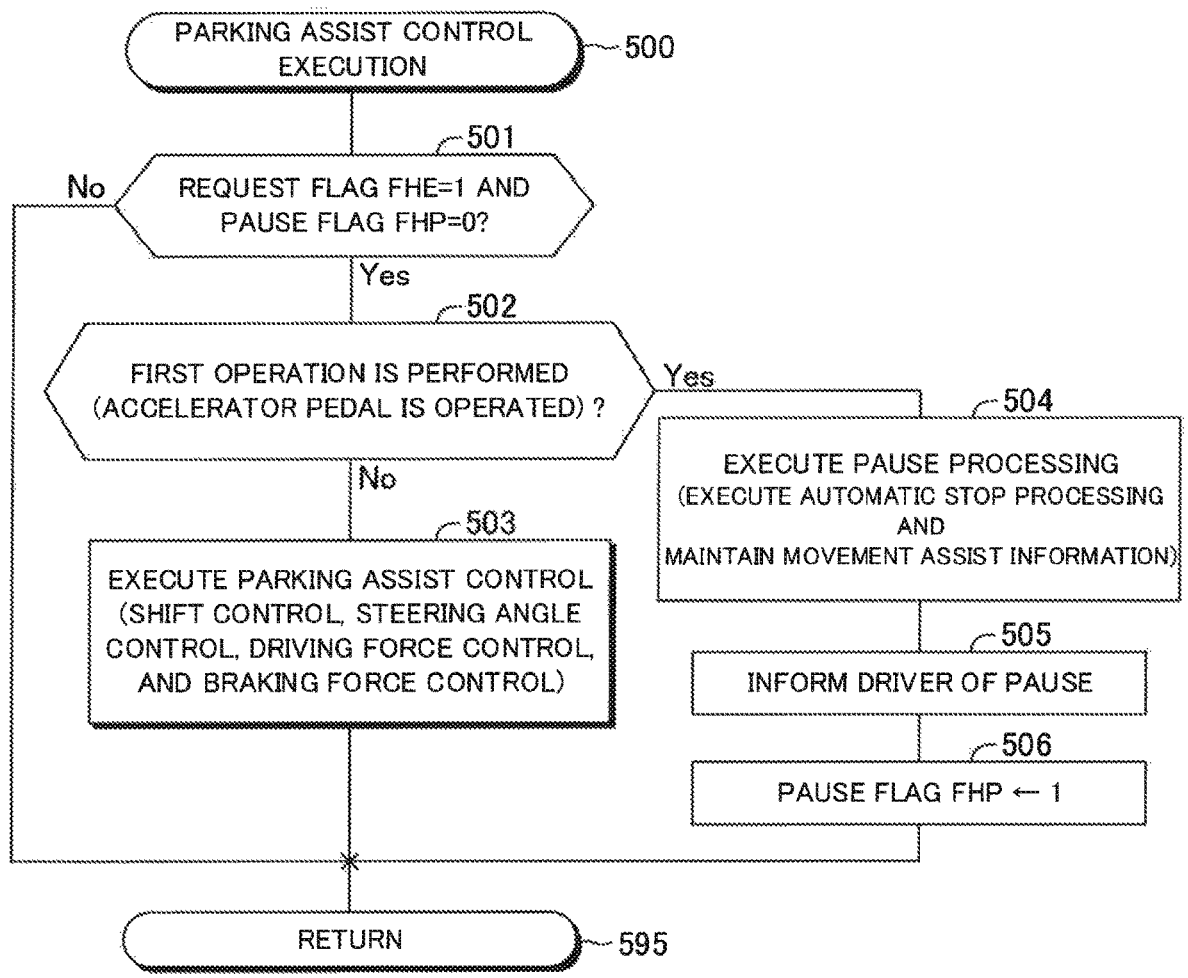
FIG. 5 is a flowchart for illustrating a "parking assist control execution routine" to be executed by the CPU of the parking assist ECU in the embodiment.

Furthermore, when a predetermined timing is reached, the CPU starts the processing from Step 500 of FIG. 5, and proceeds to Step 501. In Step 501, the CPU determines whether or not the value of the request flag FHE is "1" and a value of a pause flag FHP is "0", When the value of the, pause flag FHP is "0", this means that the, parking assist control is not paused. When the value of the pause flag FHP is "1", this means that the parking assist control is paused (temporarily stopped), When the value of the request flag FHE is "0" or the value of the pause flag FHP is "1", the CPU makes a "No" determination in Step 501, proceeds directly to Step 595, and tentatively terminates the present routine.

On the other hand, when the value of the request flag FHE is "1" and the value of the pause flag FHP is "0", the CPU makes a "Yes" determination in Step 501, and proceeds to Step 502. In Step 502, the CPU determines whether or not a predetermined first operation is performed. The first operation is an operation of the accelerator pedal 21*a*.

When the predetermined first operation is not performed by the driver, the CPU makes a "No" determination in Step 502, and proceeds to Step 503 to execute the parking assist control in accordance with the movement assist information, Specifically, the CPU transmits the shift control command to the SBW ECU 40 in accordance with the determined shift position to thereby execute the shift control, The CPU transmits the steering command (including the target value of the steering angle) to the EPS ECU 50 in accordance with the steering angle pattern to thereby execute the steering angle control. The CPU transmits the driving force control command to the engine ECU 20 in accordance with the speed pattern to thereby execute the driving force control. The CPU transmits the braking force control command to the brake ECU 30 in accordance with the speed pattern to thereby execute the braking force control. Therefore, the center position of the vehicle SV can be moved to the target position Ptgt in the traveling road 801 without the operations by the driver (including the shift lever operation, the operation of the steering wheel SW, the operation of the accelerator pedal 21*a* , and the operation of the brake pedal 34). Thereafter, the CPU proceeds to Step 595, and tentatively terminates the present routine.

If the driver requests a large braking force by operating the brake pedal 34 in a situation in which the parking assist control is being executed in Step 503, the CPU transmits the braking force control command to the brake ECU 30 such that the braking force corresponding to that request is generated. In that case, the CPU transmits the driving force control command to the engine ECU 20 such that the driving force of the vehicle SV becomes zero. When the driver releases the brake pedal 34 in such a situation, the parking assist control is resumed/restarted.

Figure 9:
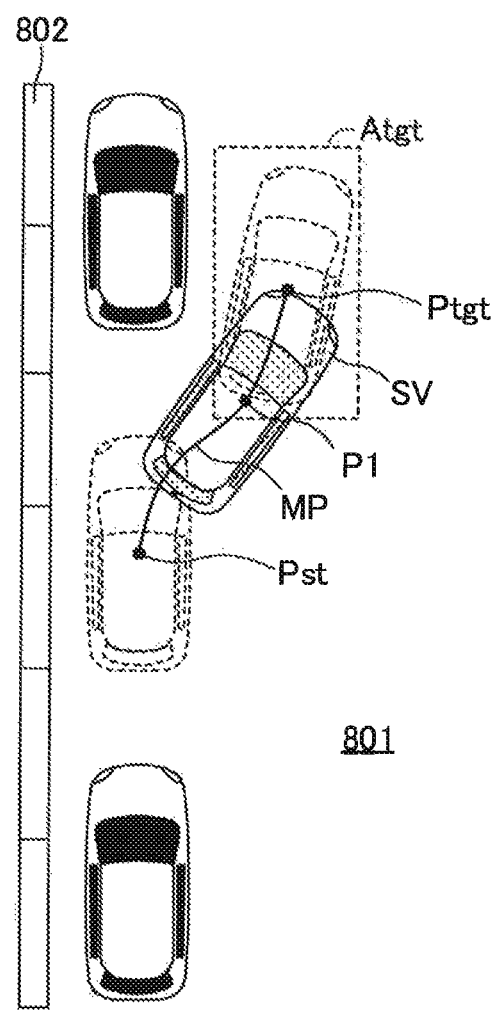
FIG. 9 is a diagram for illustrating a situation in which a driver operates an accelerator pedal after the parking assist control is started in the situation of FIG. 8, and before the vehicle has reached a target position.

Meanwhile, it is assumed that, as illustrated in FIG. 9, the driver operates the accelerator pedal 21*a* at a point in time at which the center position of the vehicle SV is moved to a position P1 between the start position Psi and the target position Ptgt. When the accelerator pedal 21a is operated by the driver before the vehicle SV has reached the target position Ptgt, the CPU makes a "Yes" determination in Step 502, and executes the processing of Steps 504 to 506 (described below) in sequence. Thereafter, the CPU proceeds to Step 595, and tentatively terminates the present routine.

Step 504: The CPU executes a predetermined pause processing for pausing the parking assist control. Specifically, the CPU executes an automatic stop processing for stopping the vehicle SV as follows. The CPU transmits the driving force control command to the engine ECU 20 such that the driving force is set to zero regardless of the operation by the driver on the accelerator pedal 21a. Further, the CPU transmits the braking force control command to the brake ECU 30 to generate the braking force to thereby stop the vehicle SV. In this manner, when the center position of the vehicle SV is positioned at the position P1, the vehicle SV is stopped. Further, the CPU maintains/holds in the RAM the movement assist information (including the movement direction of the vehicle, the steering angle pattern and the speed pattern) during the pause of the parking assist control.

Figure 10:
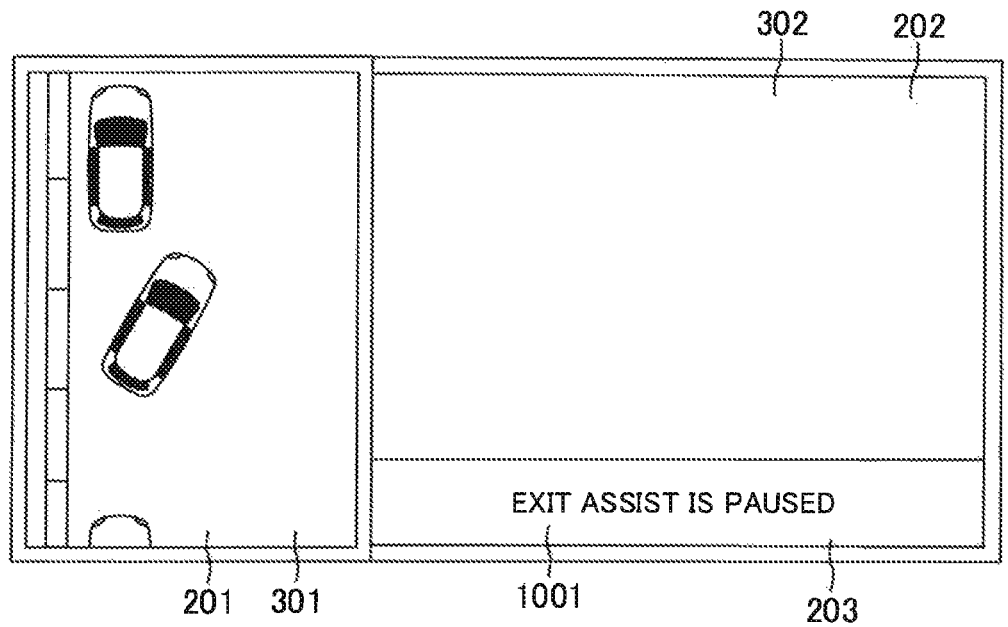
FIG. 10 is a diagram for illustrating a message displayed on the assist mode screen in the situation of FIG. 9.

Step 505: The CPU informs the driver that the parking assist control is paused. Specifically, as illustrated in FIG. 10, the CPU displays in the third display region 203 of the assist mode screen a message 1001 notifying that the parking assist control (in this case, the exit assist) is paused, and causes the speaker 83 to utter the message 1001.

Step 506: The CPU sets the value of the pause flag FHP to "1".

Figure 6:
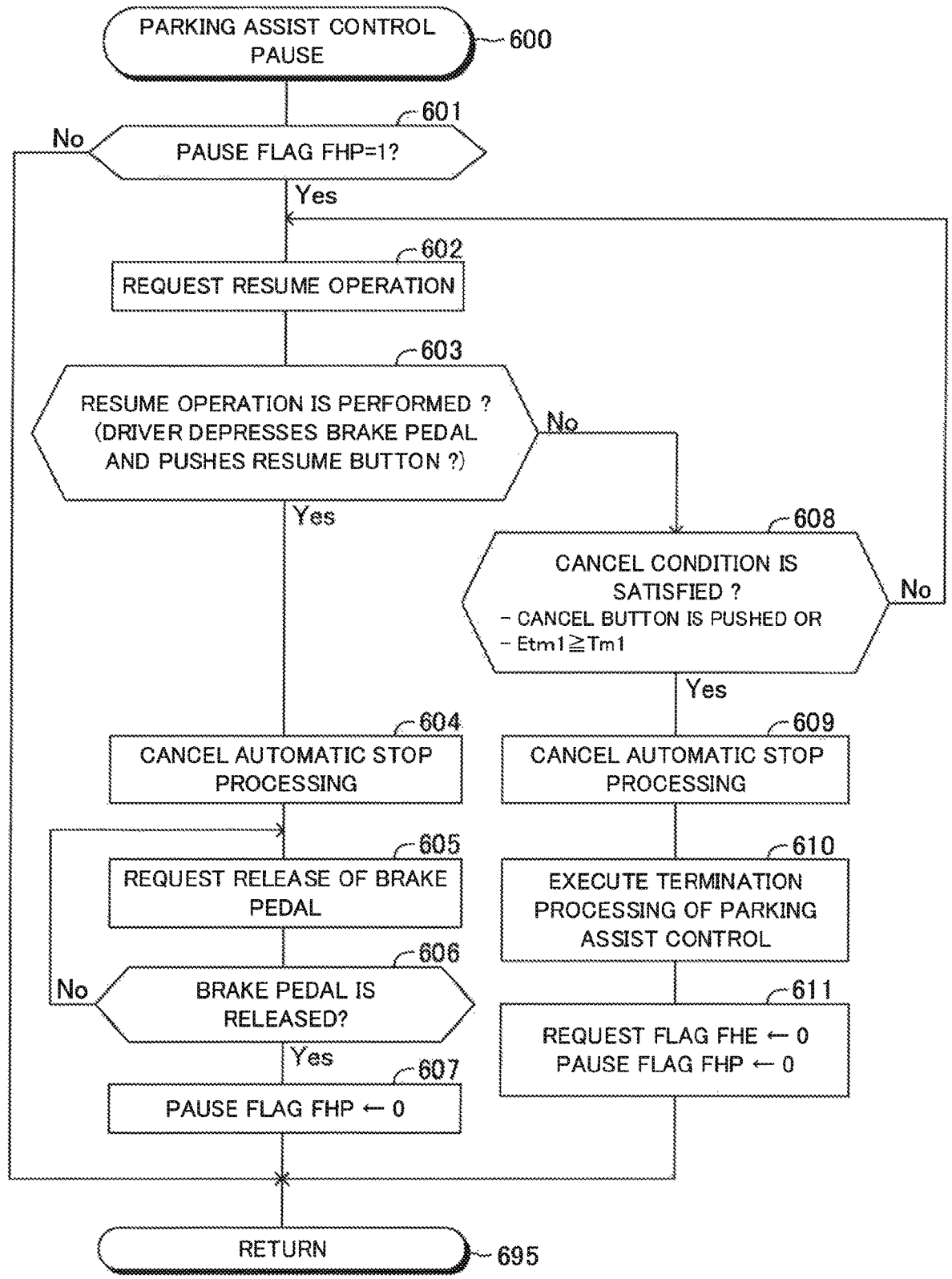
FIG. 6 is a flowchart for illustrating a "parking assist control pause routine" to be executed by the CPU of the parking assist ECU in the embodiment.

In addition, when a predetermined timing is reached, the CPU starts the processing from Step 600 of FIG. 6, and proceeds to Step 601. In Step 601, the CPU determines whether or not the value of the pause flag FHP is "1", When the value of the pause flag FHP is not "1", the CPU makes a "No" determination in Step 601, proceeds directly to Step 695, and tentatively terminates the present routine.

Figure 11:
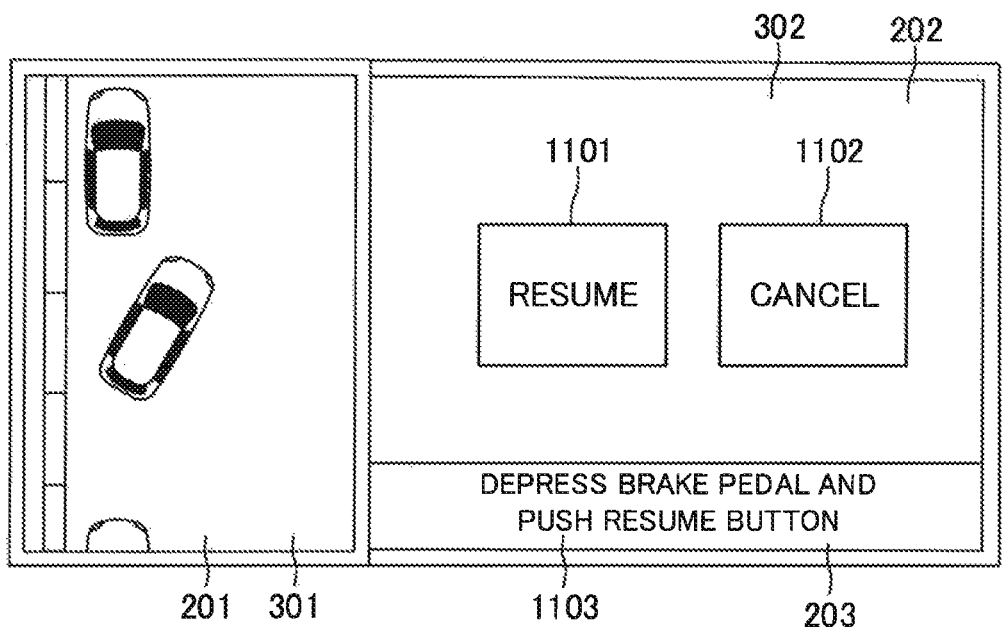
FIG. 11 is a diagram for illustrating a message and a button displayed on the assist mode screen in the situation of FIG. 9.

On the other hand, in the situation illustrated in FIG. 9, the value of the pause flag FHP is "1". Thus, the CPU makes a "Yes" determination in Step 601, and proceeds to Step 602. In Step 602, the CPU requests the driver to perform a predetermined resume operation for resuming the parking assist control. Specifically, as illustrated in FIG. 11, the CPU displays a resume button 1101 and a cancel button 1102 in the second display region 202 of the assist mode screen, Further, the CPU displays in the third display region 203 of the assist mode screen a message 1103 requesting to depress the brake pedal 34 and push the resume button 1101, and causes the speaker 83 to utter the message 1103. In this manner, the CPU notifies the driver of the resume operation.

Next, in Step 603, the CPU determines whether or not the resume operation is performed by the driver. When the driver depresses the brake pedal 34 and pushes the resume button 1101, the CPU makes a "Yes" determination in Step 603, and executes the processing of Steps 604 and 605 (described below) in sequence. Next, the CPU proceeds to Step 606.

Step 604: The CPU cancels the automatic stop processing which has been continued from the point in time at which the pause processing is started in Step 504 of the routine of FIG. 5. Therefore, after this time point, the CPU transmits the braking force control command to the brake ECU 30 such that the braking force corresponding to the operation of the brake pedal 34 by the driver is generated.

Figure 12:
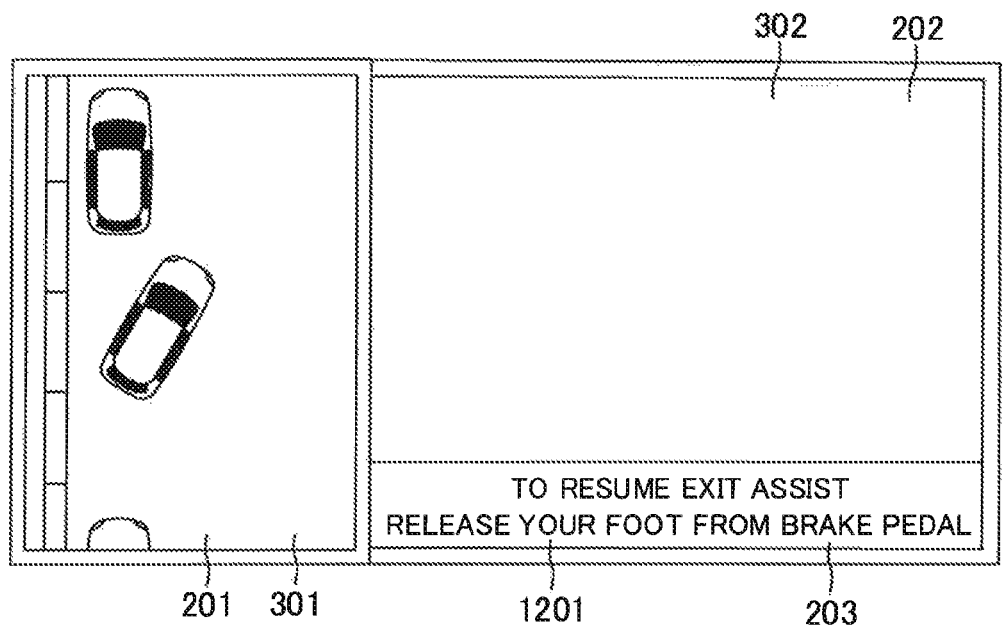
FIG. 12 is a diagram for illustrating a message displayed on the assist mode screen in the situation of FIG. 9.
Figure 13:
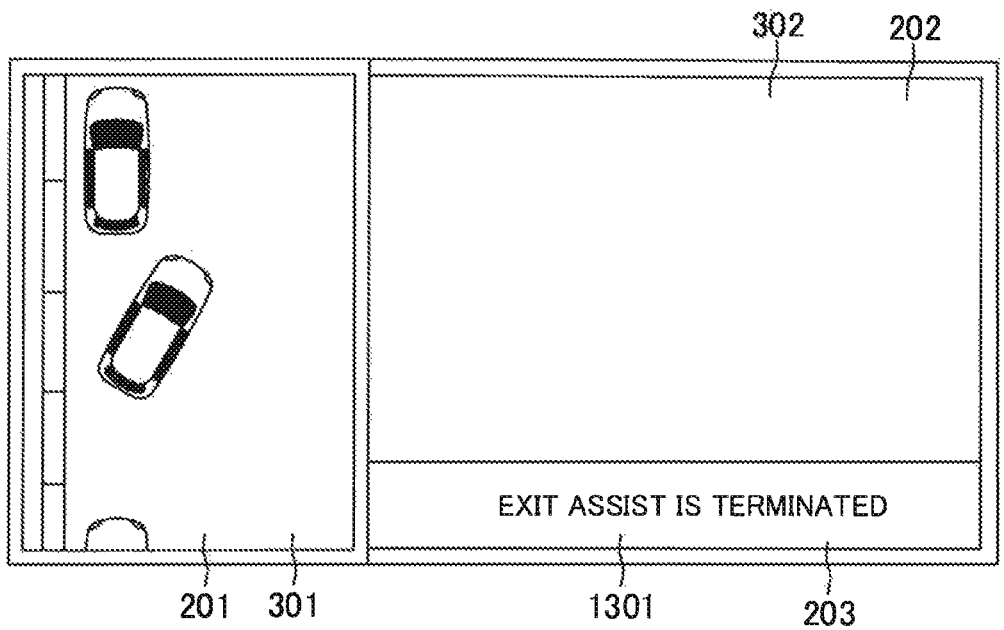
FIG. 13 is a diagram for illustrating a message displayed on the assist mode screen in the situation of FIG. 9.

Step 605: The CPU requests the driver to release the brake pedal 34. Specifically, as illustrated in FIG. 12, the CPU displays in the third display region 203 of the assist mode screen a message 1201 requesting to release the driver's foot from the brake pedal 34, and causes the speaker 83 to utter the message 1201.

Next, in Step 606, the CPU determines whether or not the brake pedal 34 is released. When the brake pedal 34 is not released, the CPU returns to the processing of Step 605.

On the other hand, when the brake pedal 34 is released, the CPU makes a "Yes" determination in Step 606, and proceeds to Step 607 to set the value of the pause flag FHP to "0". Thereafter, the CPU proceeds to Step 695, and tentatively terminates the present routine. Therefore, the CPU makes a "Yes" determination in Step 501 in the routine of FIG. 5, makes a "No" determination in Step 502, and then, proceeds to Step 503. In Step 503, the CPU resumes the parking assist control in accordance with the movement assist information which has been maintained since the pause processing is started in Step 504 in the routine of FIG. 5.

Meanwhile, when the resume operation is not performed at the point in time at which the CPU proceeds to Step 603, the CPU makes a "No" determination in Step 603, and proceeds to Step 608. In Step 608, the CPU determines whether or not a predetermined cancel condition is satisfied, The cancel condition is satisfied when the cancel button 1102 is pushed, or an elapsed time Etm1 since the time in point at which the resume operation is first requested in Step 602 becomes equal to or longer than a predetermined first time threshold Tm1. When the cancel condition is not satisfied, the CPU makes a "No" determination in Step 608, and returns to Step 602.

When the cancel condition is satisfied, the CPU makes a "Yes" determination in Step 608, and executes the processing of Steps 609 to 611 (described below) in sequence. Thereafter, the CPU proceeds to Step 695, and tentatively terminates the present routine.

Step 609: The CPU cancels the automatic stop processing which has been continued from the point in time at which the pause processing is started in Step 504 of the routine of FIG. 5. Therefore, after this time point, the CPU transmits the driving force control command to the engine ECU 20 such that the driving force corresponding to the operation of the accelerator pedal 21a by the driver is generated, Further, the CPU transmits the braking force control command to the brake ECU 30 such that the braking force corresponding to the operation of the brake pedal 34 by the driver is generated, Step 610: The CPU executes a predetermined termination processing. Specifically, the CPU erases/removes from the RAM the movement assist information which has been maintained since the pause processing is started in Step 504 in the routine of FIG. 5. Further, as illustrated in FIG, 13, the CPU displays in the third display region 203 of the assist mode screen a message 1301 notifying that the exit assist (the parking assist control in the exit-from-parking-space mode) is terminated, and causes the speaker 83 to utter the message 1301.

Step 611: The CPU sets the value of the request flag FHE to "0", and sets the value of the pause flag FHP to "0".

Thereafter, when the CPU again starts the routine of FIG, 5 from Step 500 and proceeds to Step 501, the CPU makes a "No" determination and proceeds directly to Step 595. Therefore, the parking assist control is terminated.

Figure 7:
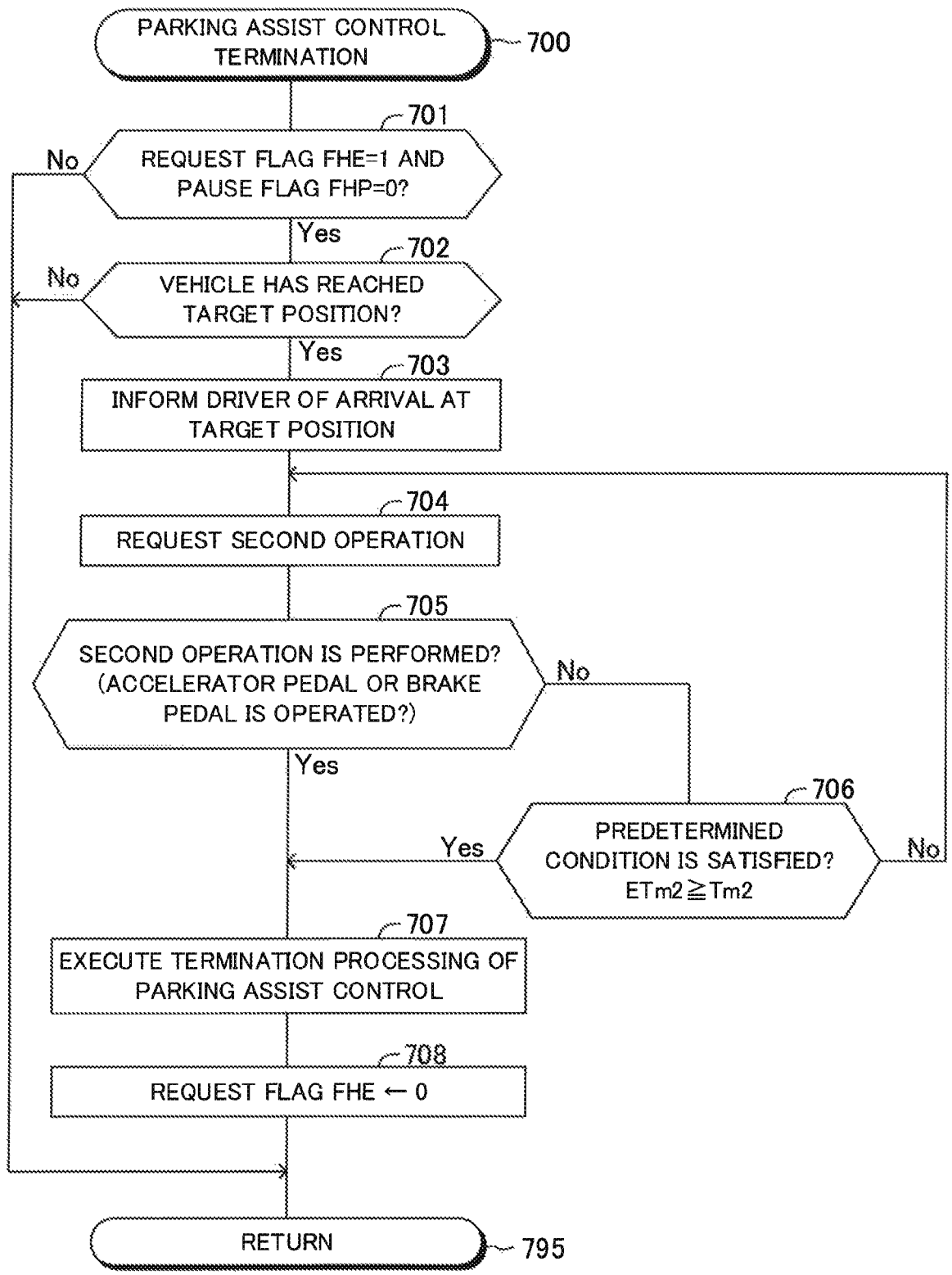
FIG. 7 is a flowchart for illustrating a "parking assist control termination routine" to be executed by the CPU of the parking assist ECU in the embodiment.

When a predetermined timing is reached, the CPU starts the processing from Step 700 of FIG. 7, and proceeds to Step 701. In Step 701, the CPU determines whether or not the value of the request flag FHE is "1" and the value of the pause flag FHP is "0", When the value of the request flag FHE is "0" or the value of the pause flag FHP is "1", the CPU makes a "No" determination in Step 701, proceeds directly to Step 795, and tentatively terminates the present routine.

On the other hand, when the value of the request flag FHE is "1" and the value of the pause flag FHP is "0", the CPU makes a "Yes" determination in Step 701, and proceeds to Step 702. In Step 702, the CPU determines whether or not the center position of the vehicle SV has reached the target position Ptgt. When the center position of the vehicle SV has not yet reached the target position Ptgt, the CPU makes a "No" determination in Step 702, proceeds directly to Step 795, and tentatively terminates the present routine.

Figure 14:
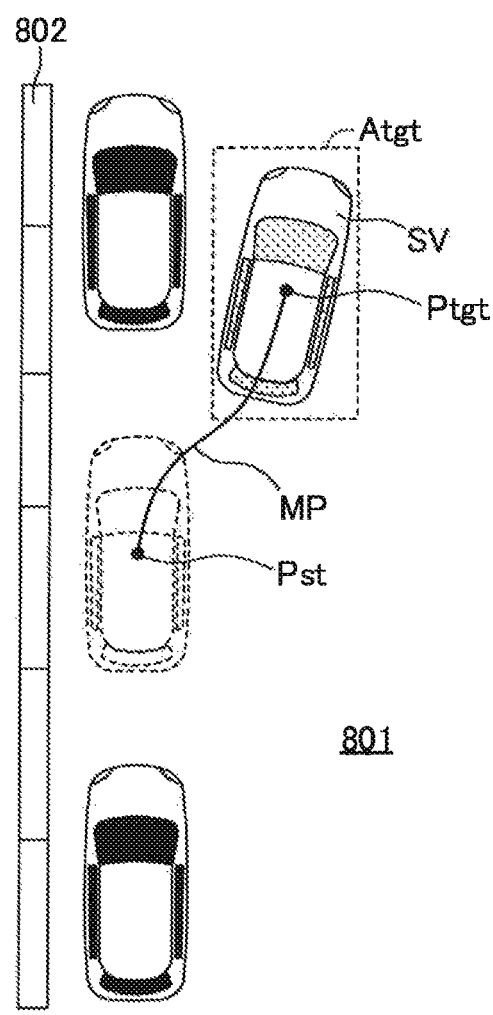
FIG. 14 is a diagram for illustrating a situation in which the vehicle, has reached the target position after the parking assist control is started in the situation of FIG. 8.

It is assumed that the center position of the vehicle SV has reached the target position Ptgt as illustrated in FIG. 14. In this case, the CPU makes a "Yes" determination in Step 702, and executes the processing of Steps 703 and 704 (described below) in sequence. Next, the CPU proceeds to Step 706.

Figure 15:
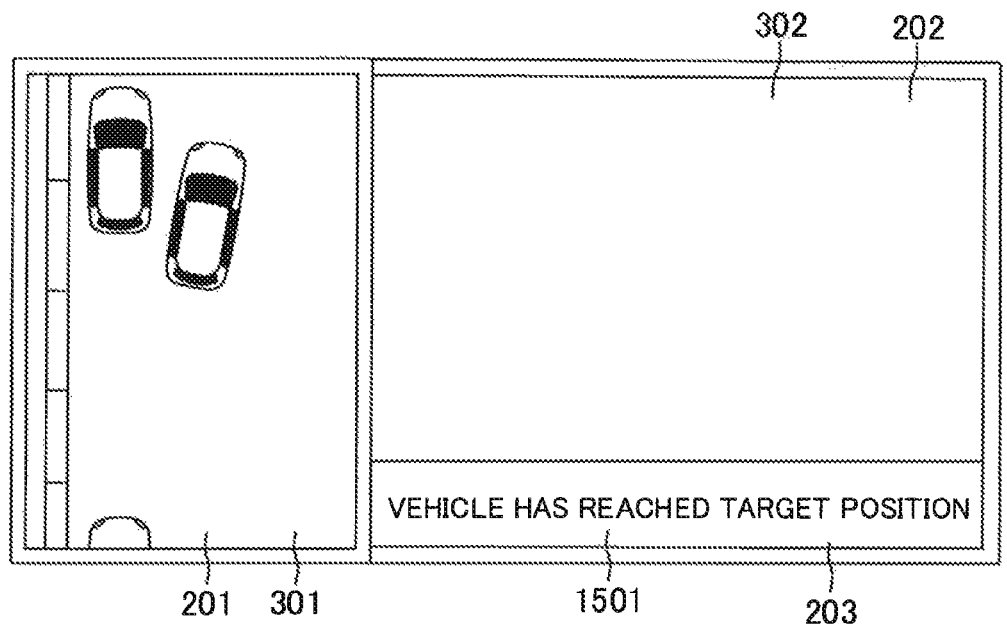
FIG. 15 is a diagram for illustrating a message displayed on the assist mode screen in the situation of FIG. 14.

Step 703: As illustrated in FIG. 15, the CPU displays in the third display region 203 of the assist mode screen a message 1501 notifying that the vehicle has reached the target position, and causes the speaker 83 to utter the message 1501.

Figure 16:
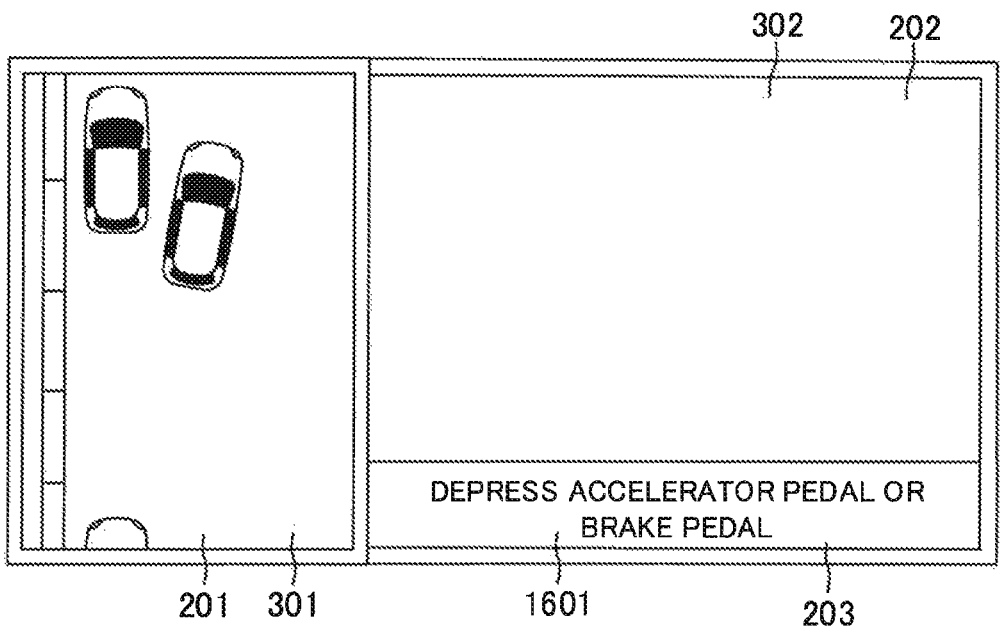
FIG. 16 is a diagram for illustrating a message displayed on the assist mode screen in the situation of FIG. 14.

Step 704: The CPU requests the driver to perform a predetermined second operation for terminating the parking assist control. The second operation is the operation of the. accelerator pedal 21*a* or the operation of the brake pedal 34. As illustrated in FIG. 16, the CPU displays in the third display region 203 of the assist mode screen a message 1601 requesting to depress the accelerator pedal 21*a* or the brake pedal 34, and causes the speaker 83 to utter the message 1601.

Next, in Step 705, the CPU determines whether or not the predetermined second operation is performed by the driver, When the second operation is performed, the CPU makes a "Yes" determination in Step 705, and executes the processing of Steps 707 and 708 (described below) in sequence. Thereafter, the CPU proceeds directly to Step 795, and tentatively terminates the present routine.

Figure 17:
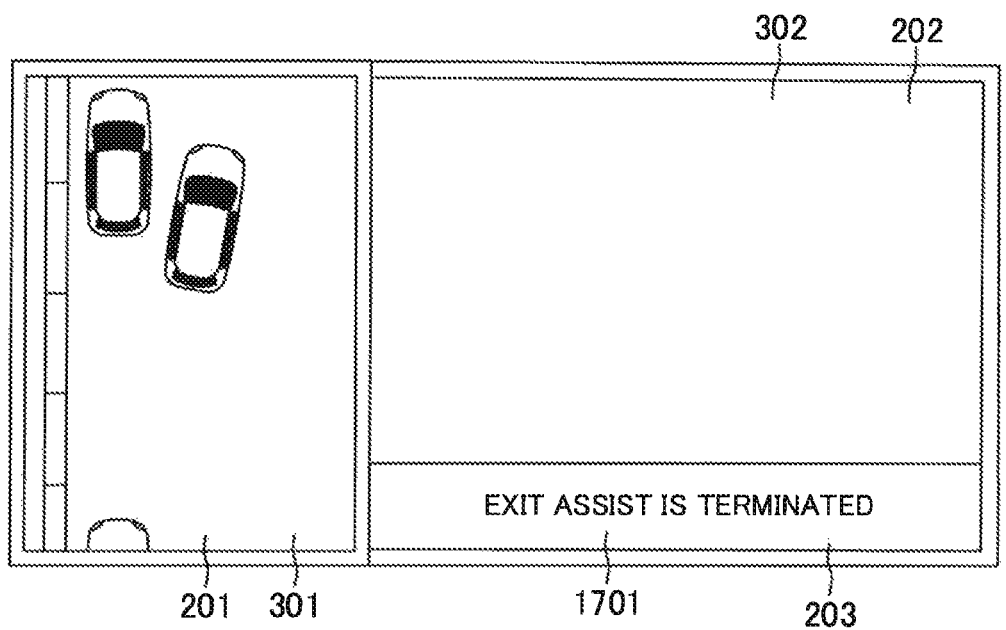
FIG. 17 is a diagram for illustrating a message displayed on the assist mode screen in the situation of FIG. 14.

Step 707: The CPU executes a predetermined termination processing, the CPU erases/removes the movement assist information from the RAM. Further, as illustrated in FIG. 17, the CPU displays in the third display region 203 of the assist mode screen a message 1701 notifying that the exit assist (the parking assist control in the exit-from-parking-space, mode) is terminated, and causes the speaker 83 to utter the message 1701.

Step 708: The CPU sets the value of the request flag FHE to "0".

Thereafter, when the CPU again starts the routine of FIG. 5 from Step 500 and proceeds to Step 501, the CPU makes a "No" determination and proceeds directly to Step 595, In this manner, the parking assist control is terminated at the point in time at which the driver performs the second operation.

When the predetermined second operation is not performed at the point in time at which the CPU proceeds to Step 705, the CPU makes a "No" determination in Step 705, and proceeds to Step 706. In Step 706, the CPU determines whether or not a predetermined condition is satisfied. This condition is satisfied when an elapsed time Etm2 since the time in point at which the second operation is first requested in Step 704 becomes equal to or longer than a predetermined second time threshold Tm2. When the predetermined condition is not satisfied, the CPU makes a "No" determination in Step 706, and returns to Step 704.

When the predetermined condition is satisfied, the CPU makes a "Yes" determination in Step 70$, and executes the processing of Steps 707 and 708 as described above. Thereafter, the CPU proceeds to Step 795, and tentatively terminates the present routine. Therefore, at a point in time at which the elapsed time Etm2 becomes equal to or longer than the second time threshold Tm2, the parking assist control is terminated.

As described above, in a time period (first time period) from a first point in time (Step 407) at which the movement assist information is determined to a second point in time immediately before the vehicle SV (i.e., the center position thereof) has reached the target position Ptgt (Step 702:Yes), when the driver performs the predetermined first operation (operation of the accelerator pedal 21*a* ), the parking assist apparatus executes the predetermined pause processing. The pause processing is processing for applying the braking force to the vehicle SV to stop the vehicle SV while maintaining the movement assist information in the RAM.

When the driver operates the accelerator pedal 21*a* before the vehicle SV has reached the target position Ptgt, the speed of the vehicle SV is increased, Thus, there is a high possibility that the vehicle SV excessively approaches an object (for example, another vehicle) present in the peripheral region of the vehicle. According to the present embodiment, the parking assist apparatus pauses (temporarily stops) the parking assist control and stops the vehicle SV in the above-mentioned situation. Therefore, it is possible to prevent the vehicle SV from excessively approaching an object present in the peripheral region of the vehicle.

Further, after the parking assist apparatus executes the pause processing, when the predetermined resume operation is performed by the driver, the parking assist apparatus resumes the parking assist control in accordance with the movement assist information which has been maintained since the pause processing is stared. Even when the parking assist control is paused, the driver can resume the parking assist control by performing the resume operation. In that case, in order to resume the parking assist control, it is not necessary for the driver to again perform some operations for selecting the exit-from-parking-space mode (for example, the operation for returning the shift position to the parking position (P), the depressing operation with respect to the parking assist switch 82, and the like), Furthermore, there is no need to recalculate the movement assist information. Therefore, the time required for the vehicle SV to be exited from a parking space can be shortened.

Meanwhile, at the point in time at which the pause processing for the parking assist control is started, the driver may not wish to execute the parking assist control thereafter. In that case, the driver can push the cancel button 1102 or wait for the first time threshold Tm1 without performing the resume operation. The parking assist control is terminated, and therefore, the driver can drive the vehicle SV by his/her operation.

Further, in a time period (second time period) from the point in time at which the vehicle SV has reached the target position Ptgt (Step 702:Yes) until the predetermined second time threshold Tm2 has elapsed, when the driver performs the predetermined second operation (the operation with respect to the accelerator pedal 21*a* or the brake pedal 34), the parking assist apparatus terminates the parking assist control.

When the driver operates the accelerator pedal 21*a* or the brake pedal 34 on and after the vehicle has reached the target position Ptgt, it is considered that the driver can immediately drive the vehicle SV by his/her driving operation. According to the present embodiment, the parking assist apparatus terminates the parking assist control in the above-mentioned situation to thereby immediately hand over the driving of the vehicle SV to the driver.

(Operation for Perpendicular-Parking Assist)

Next, operations to be performed when the parking assist control is executed in the perpendicular-parking mode are described. Hereinafter, the parking assist control in the, perpendicular-parking mode will be simply referred to as an "perpendicular-parking assist". The perpendicular-parking assist is similar to the exit assist except that the region (target region) to which the vehicle is to finally moved is different. Therefore, the routines of FIGS. 4 to 7 can be applied to the perpendicular-parking assist. The routines of FIGS. 4 and 7 are different from the case of the exit assist in the following points, respectively, The following description mainly focuses on differences.

When the CPU starts the processing from Step 400 of FIG, 4 and proceeds to Step 402, the CPU determines whether or not the perpendicular-parking mode has been selected (whether or not the condition B2 is satisfied), When it is determined that the perpendicular-parking mode has not been selected, the CPU makes a "No" determination in Step 402, proceeds directly to Step 495, and tentatively terminates the present routine.

Assuming that the perpendicular-parking mode has been selected, the CPU makes a "Yes" determination in Step 402, and proceeds to Step 403 to determine whether or not both of the conditions B3 and B4 are satisfied. The conditions B3 and B4 will be collectively referred to as an "execution condition for the perpendicular-parking assist". When the execution condition for the perpendicular-parking assist is not satisfied, the CPU makes a "No" determination in Step 403, proceeds directly to Step 495, and tentatively terminates the present routine.

When the execution condition for the perpendicular-parking assist is satisfied, the CPU makes a "Yes" determination in Step 403, the CPU executes the processing in appropriate steps from among Steps 404 to 408 as described above.

When the CPU starts the processing from Step 700 of FIG. 7 and proceeds to Step 704, the CPU requests the driver to perform the predetermined second operation for terminating the parking assist control. The second operation herein is the operation of the brake pedal 34. The CPU displays in the third display region 203 of the assist mode screen a message requesting to depress the brake pedal 34, and causes the speaker 83 to utter the message. Thereafter, the CPU executes the processing in appropriate steps from among Steps 705 to 708 as described above.

(Operation for Parallel-Parking Assist)

Next, operations to be performed when the parking assist control is executed in the parallel-parking mode are described, Hereinafter, the parking assist control in the parallel-parking mode will be simply referred to as an "parallel-parking assist". The parallel-parking assist is similar to the exit assist except that the region (target region) to which the vehicle is to finally moved is different, Therefore, the routines of FIGS. 4 to 7 can be applied to the parallel-parking assist. The routines of FIGS. 4 and 7 are different from the case of the exit assist in the following points, respectively. The following description mainly focuses on differences.

When the CPU starts the processing from Step 400 of FIG. 4 and proceeds to Step 402, the CPU determines whether or not the parallel-parking mode has been selected (whether or not the condition C2 is satisfied). When it is determined that the parallel-parking mode has not been selected, the CPU makes a "No" determination in Step 402, proceeds directly to Step 495, and tentatively terminates the present routine.

Assuming that the parallel-parking mode has been selected, the CPU makes a "Yes" determination in Step 402, and proceeds to Step 403 to determine whether or not both of the conditions C3 and C4 are satisfied. The conditions C3 and C4 will be collectively referred to as an "execution condition for the parallel-parking assist". When the execution condition for the parallel-parking assist is not satisfied, the CPU makes a "No" determination in Step 403, proceeds directly to Step 495, and tentatively terminates the present routine.

When the execution condition for the parallel-parking assist is satisfied, the CPU makes a "Yes" determination in Step 403, the CPU executes the processing in appropriate steps from among Steps 404 to 408 as described above.

When the CPU starts the processing from Step 700 of FIG. 7 and proceeds to Step 704, the CPU requests the driver to perform the predetermined second operation for terminating the parking assist control. The second operation herein is the operation of the brake pedal 34. The CPU displays in the third display region 203 of the assist mode screen a message requesting to depress the brake pedal 34, and causes the speaker 83 to utter the message. Thereafter, the CPU executes the processing in appropriate steps from among Steps 705 to 708 as described above.

As described above, when executing the perpendicular-parking assist or the parallel-parking assist, the parking assist apparatus can pause or terminate the parking assist control in response to the operation by the driver.

The present disclosure is not limited to the embodiment described above, and various modification examples can be adopted within the scope of the present disclosure.

MODIFICATION EXAMPLE 1

The first operation (see Step 502) is not limited to the above example. In one or more embodiments, the first operation may include an operation of the steering wheel SW. For example, during execution of the parking assist control, the CPU of the parking assist ECU 10 monitors whether or not the driver inputs a steering torque to the steering wheel SW based on the signal from the steering torque sensor 53. When the CPU determines that the driver inputs a steering torque to the steering wheel SW in Step 502 in the routine of FIG. 5, the CPU may determine that the first operation is performed. In one or more embodiments, the second operation (see Steps 704 and 705) may include an operation of the steering wheel SW.

MODIFICATION EXAMPLE 2

The resume operation (see Steps 602 and 603) is not limited to the above example. In one or more embodiments, the resume operation may be any one operation of the depression of the brake pedal 34 and the pushing of the resume button 1101. In one or more embodiments, the resume button is not limited to the button displayed on the touch panel 63, and may be a button or a switch provided in the vicinity of the steering wheel SW. In one or more embodiments, the parking assist switch 82 may include the function of the resume button.

MODIFICATION EXAMPLE 3

The parking assist control may be other control as long as it includes at least the steering angle control, the driving force control and the braking force control. In one or more embodiments, the parking assist control may not include the shift control. When the parking assist control does not include the shift control, the CPU of the parking assist ECU 10 informs the driver of the movement direction of the vehicle (specifically. the shift position of the transmission 24) through the assist mode screen on the touch panel 63 and/or the speaker 83 after Step 407 in the routine of FIG. 4. When the driver operates the shift lever such that the shift position matches the informed shift position, the CPU proceeds to Step 408 to set the value of the request flag FHE to "1". Thereafter, the CPU executes the parking assist control in the routine of FIG. 5.

MODIFICATION EXAMPLE 4

The parking assist switch 82 is only required to he a switch to be operated when the driver requests the parking/exit assist to generate a signal representing the request. In one or more embodiments, the parking assist switch may be a device configured to recognize a request for the, parking/exit assist by the driver by using a voice recognition device.

What is claimed is:

1. A parking assist apparatus for a vehicle, comprising:
a sensor configured to acquire vehicle peripheral information including information on an object present in a peripheral region of the vehicle;
an electronic control unit configured to, when an assist request is generated,
set a target position which is a position of the vehicle at a point in time at which the vehicle completes parking in a parking space or exiting from the parking space based on the vehicle peripheral information,
set, as a movement path, a path along which the vehicle is movable from a current position of the vehicle to the target position, and
determine movement assist information including steering angle information representing changes in a steering angle of the vehicle when the vehicle moves along the movement path; and
the electronic control unit configured to execute parking assist control such that the vehicle moves in accordance with the determined movement assist information, the parking assist control including steering angle control for changing the steering angle of the vehicle, driving force control for controlling a driving force of the vehicle, and braking force control for controlling a braking force of the vehicle,
wherein the electronic control unit is further configured to, when an occupant performs a predetermined first operation that is an operation to one of an accelerator pedal and a shift lever in a first time period,
apply the braking force to the vehicle to stop the vehicle, and
execute pause processing for maintaining the movement assist information, the first time period being a period from a first point in time at which the movement assist information is determined to a second point in time immediately before the vehicle has reached the target position.

2. The parking assist apparatus according to claim 1, wherein the electronic control unit is configured to, when executing the pause processing, notify the occupant of a predetermined resume operation to be performed by the occupant for resuming the parking assist control, and wherein the electronic control unit is configured to,
when the occupant performs the resume operation, resume the parking assist control in accordance with the movement assist information which has been maintained since the pause processing is started, and
when the occupant does not perform the resume operation in a time period from the notification of the resume operation until a predetermined time threshold elapses, erase the movement assist information which has been maintained since the pause processing is started, and terminate the parking assist control.

3. The parking assist apparatus according to claim 1, wherein the electronic control unit is configured to, when the occupant performs a predetermined second operation in a second time period from a point in time at which the vehicle has reached the target position until a predetermined time has elapsed, terminate the parking assist control at a point in time at which the occupant performs the second operation, and
wherein the electronic control unit is configured to, when the occupant does not perform the second operation in the second time period, terminate the parking assist control at a point in time at which the second time period has elapsed.

4. The parking assist apparatus according to claim 3, wherein the electronic control unit is configured to, when the occupant operates the accelerator pedal in the first time period, determine that the occupant performs the first operation, and
wherein the electronic control unit is configured to, when the occupant operates the accelerator pedal or the brake pedal in the second time period, determine that the occupant performs the second operation.

5. A parking assist apparatus for a vehicle, comprising:
a sensor configured to acquire vehicle peripheral information including information on an object present in a peripheral region of the vehicle;
an electronic control unit configured to, when an assist request is generated,
set a target position which is a position of the vehicle at a point in time at which the vehicle completes parking in a parking space or exiting from the parking space based on the vehicle peripheral information,
set, as a movement path, a path along which the vehicle is movable from a current position of the vehicle to the target position, and
determine movement assist information including steering angle information representing changes in a steering angle of the vehicle when the vehicle moves along the movement path; and
execute parking assist control such that the vehicle moves in accordance with the determined movement assist information, the parking assist control including steering angle control for changing the steering angle of the vehicle, driving force control for controlling a driving force of the vehicle, and braking force control for controlling a braking force of the vehicle,
wherein the electronic control unit is further configured to, when an occupant performs a predetermined operation that is an operation to one of an accelerator pedal and a shift lever before the vehicle reaches the target position, apply the braking force to the vehicle to stop the vehicle and pause the parking assist control.

6. The parking assist apparatus according to claim 5, wherein the electronic control unit is configured to, when an occupant performs the predetermined operation serving as a first operation in a first time period, execute pause processing for maintaining the movement assist information, the first time period being a period from a first point in time at which the movement assist information is determined to a second point in time immediately before the vehicle has reached the target position.

7. The parking assist apparatus according to claim 6, wherein the electronic control unit is configured to, when executing the pause processing, notify the occupant of a predetermined resume operation to be performed by the occupant for resuming the parking assist control, and wherein the electronic control unit is configured to when the occupant performs the resume operation, resume the parking assist control in accordance with the movement assist information which has been maintained since the pause processing is started, and when the occupant does not perform the resume operation in a time period from the notification of the resume operation until a predetermined time threshold elapses, erase the movement assist information which has been maintained since the pause processing is started, and terminate the parking assist control.

8. The parking assist apparatus according to claim 6, wherein the electronic control unit is configured to, when the occupant performs a predetermined second operation in a second time period from a point in time at which the vehicle has reached the target position until a predetermined time has elapsed, terminate the parking assist control at a point in time at which the occupant performs the second operation, and wherein the electronic control unit is configured to, when the occupant does not perform the second operation in the second time period, terminate the parking assist control at a point in time at which the second time period has elapsed.

9. The parking assist apparatus according to claim 8, wherein the electronic control unit is configured to, when the occupant operates the accelerator pedal in the first time period, determine that the occupant performs the first operation, and wherein the electronic control unit is configured to, when the occupant operates the accelerator pedal or the brake pedal in the second time period, determine that the occupant performs the second operation.

* * * * *